US010992552B2

(12) United States Patent
Li et al.

(10) Patent No.: US 10,992,552 B2
(45) Date of Patent: Apr. 27, 2021

(54) DEVICE AND METHOD FOR ADDING AN M2M SERVICE

(71) Applicant: Convida Wireless, LLC, Wilmington, DE (US)

(72) Inventors: Hongkun Li, Malvern, PA (US); Guang Lu, Thornhill (CA); Chonggang Wang, Princeton, NJ (US); Qing Li, Princeton Junction, NJ (US); Lijun Dong, San Diego, CA (US); Catalina Mihaela Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 147 days.

(21) Appl. No.: 15/567,698

(22) PCT Filed: Apr. 22, 2016

(86) PCT No.: PCT/US2016/028848
§ 371 (c)(1),
(2) Date: Oct. 19, 2017

(87) PCT Pub. No.: WO2016/172484
PCT Pub. Date: Oct. 27, 2016

(65) Prior Publication Data
US 2018/0115467 A1 Apr. 26, 2018

Related U.S. Application Data

(60) Provisional application No. 62/151,841, filed on Apr. 23, 2015.

(51) Int. Cl.
H04L 12/24 (2006.01)
H04L 29/08 (2006.01)
(Continued)

(52) U.S. Cl.
CPC ...... *H04L 41/5054* (2013.01); *H04L 41/0893* (2013.01); *H04L 67/10* (2013.01);
(Continued)

(58) Field of Classification Search
CPC . H04L 41/5054; H04L 41/0893; H04L 67/12; H04L 67/10; H04W 4/70; H04W 4/38
(Continued)

(56) References Cited

U.S. PATENT DOCUMENTS

2005/0027871 A1 2/2005 Bradley et al.
2006/0178918 A1* 8/2006 Mikurak .......... G06Q 10/06375
705/7.25
(Continued)

FOREIGN PATENT DOCUMENTS

CN 103262063 A 8/2013
CN 103503336 A 1/2014
(Continued)

OTHER PUBLICATIONS

W3C "Web Services Description Language (SWDL) Version 2.0" W3C Recommendation Jun. 26, 2007, 103 pages.
(Continued)

*Primary Examiner* — Moustafa M Meky
*Assistant Examiner* — Elizabeth Kassa
(74) *Attorney, Agent, or Firm* — BakerHostetler

(57) ABSTRACT

The present application is directed to a device on a network that is configured to add a service. The device includes a memory that is operably coupled to the processor. The processor is adapted to configure a service enablement policy. The processor is also adapted to receive a request to add the service from a service provider. The processor is adapted to check the service enablement policy for adding the service. The processor is also adapted to collaborate with another device to harmonize the service enablement policy (Continued)

and the host selection criteria. Further, the processor is adapted to send a reply to the service provider. The present application is also directed to a method for adding a service.

17 Claims, 23 Drawing Sheets

(51) Int. Cl.
*H04W 4/00* (2018.01)
*H04W 4/70* (2018.01)
*H04W 4/38* (2018.01)

(52) U.S. Cl.
CPC .............. *H04L 67/12* (2013.01); *H04W 4/38* (2018.02); *H04W 4/70* (2018.02)

(58) Field of Classification Search
USPC ....................................................... 709/220
See application file for complete search history.

(56) References Cited

U.S. PATENT DOCUMENTS

| | | | |
|---|---|---|---|
| 2011/0213871 A1 | 9/2011 | Digirolamo et al. | |
| 2012/0254899 A1* | 10/2012 | Sharma | G06F 9/541 719/328 |
| 2012/0278869 A1* | 11/2012 | Guccione | H04L 63/102 726/5 |
| 2013/0265932 A1 | 10/2013 | Huang et al. | |
| 2015/0142986 A1* | 5/2015 | Reznik | H04L 67/16 709/228 |
| 2015/0289123 A1* | 10/2015 | Shatzkamer | G06Q 10/06 455/406 |
| 2016/0007137 A1* | 1/2016 | Ahn | H04W 4/70 370/254 |
| 2016/0149903 A1* | 5/2016 | Suh | H04W 12/06 713/156 |
| 2017/0006455 A1* | 1/2017 | Cho | G06F 16/9535 |

FOREIGN PATENT DOCUMENTS

| | | | | |
|---|---|---|---|---|
| JP | 2007-526526 | | 9/2007 | |
| JP | 2013-521709 A | | 6/2013 | |
| JP | 2014-514887 A | | 6/2014 | |
| KR | 20150014348 A | * | 2/2015 | .............. H04W 4/70 |
| KR | 20150066401 A | * | 6/2015 | .............. H04W 4/70 |
| WO | 2014/182900 A1 | | 11/2014 | |

OTHER PUBLICATIONS

One M2M Technical Specification TS-0007 Service Component Architecture- V0.3.0, Jun. 17, 2014 105 pages.
OMA Open Mobile Alliance, "Lightweight Machine to Machine Technical Specification" Draft Version 1.3, Apr. 12, 2013, 73 pages.
OMA Open Mobile Alliance "OMA Device Management Tree and Description" Approved Version 1.2.1, Jun. 17, 2008, 48 pages.
Cheshire et al., "DNS-Based Service Discovery" Internet Engineering Task Force (IETF) RFC 6763, Feb. 2013, 50 pages.
Broadband Forum Technical Report, "TR-069 Amendment 3 CPE WAN Management Protocol" Issue 1, Protocol Version 1.2, Nov. 2010, 197 pages.
"OSGI Alliance Specifications HomePage" http://www.osgi.org/Specifications/HomePage, Downloaded Jun. 27, 2017, 2 pages.
"One M2M Technical Specification Functional Architecture" TS-0001-V1.6.0, Jan. 30, 2015, 109 pages.
"Machine-to-Machine communications (M2M); Functional architecture" ETSI TS 102690 V1.1.1; Oct. 2011, 280 pages.

\* cited by examiner

DEVICE AND METHOD FOR ADDING AN M2M SERVICE

CROSS-REFERENCE TO RELATED APPLICATIONS

This Application is a National Stage Application filed under 35 U.S.C. § 371 of International Application No. PCT/US2016/028848, filed Apr. 22, 2016, which claims priority to U.S. Provisional Application No. 62/151,841, filed Apr. 23, 2015, the disclosure of which is incorporated herein by reference in its entirety.

FIELD OF THE APPLICATION

The present application relates to apparatuses and methods for selecting a service node to add a service. More particularly, the application relates to improving the addition of a service based upon service enablement policies and/or service node selection criteria.

BACKGROUND

Generally, M2M gateways will reject a request from an Application Service Provider (ASP) to add a new service. This is due to M2M gateways not being able to support the specific service functionality. In turn, ASPs have two options. They can either stay with the M2M and host the existing services which the M2M has service functionality for, or register with a new M2M gateway that supports the functionality of the new service. However, the M2M server which the M2M gateway is registered with may be capable of hosting the new service. No protocols are in place to help guide the M2M gateway to forward the request to the M2M server.

Various factors must be considered to assess which service layer entity should add the new service requested by an ASP. This is more relevant when multiple new services are requested. Currently, when one or more ASPs requests adding services at one or more M2M gateways, each M2M gateway is only capable of adding the new service. However, the specific M2M gateway may not be the optimal choice based upon factors including ease of access and utilization of the new service. However, no protocols for selecting the service layer entity to add a new service considering different factors.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to an apparatus, system and method for selecting one or more service nodes to add a new contemplating one more factors.

In one aspect of the application, a user device is described. The device includes a non-transitory memory having instructions stored thereon for adding a service from a service provider. The device includes a processor that is operably coupled to the memory. The processor is adapted to configure a service enablement policy. The processor is also adapted to receive a request to add the service from a service provider. The processor is adapted to check the service enablement policy for adding the service. The processor is adapted to collaborate with another device to harmonize the service enablement policy and the host selection criteria. Further, the processor is adapted to send a reply to the service provider.

The present application is also directed to a method for adding a service. The method includes the step of configuring a service enablement policy. The method also includes a step of receiving a request to add the service from a service provider. The method also includes a step of checking the service enablement policy for adding the service. Further, the method includes a step of sending a reply to the service provider. According to one embodiment, the method further includes the step of receiving criteria for facilitating service node selection. According to another embodiment, the method includes a step of harmonizing the service enablement policy and the criteria. In even a further embodiment, the method includes a step of determining a service node that meets the service enablement policy and the criteria.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1A:
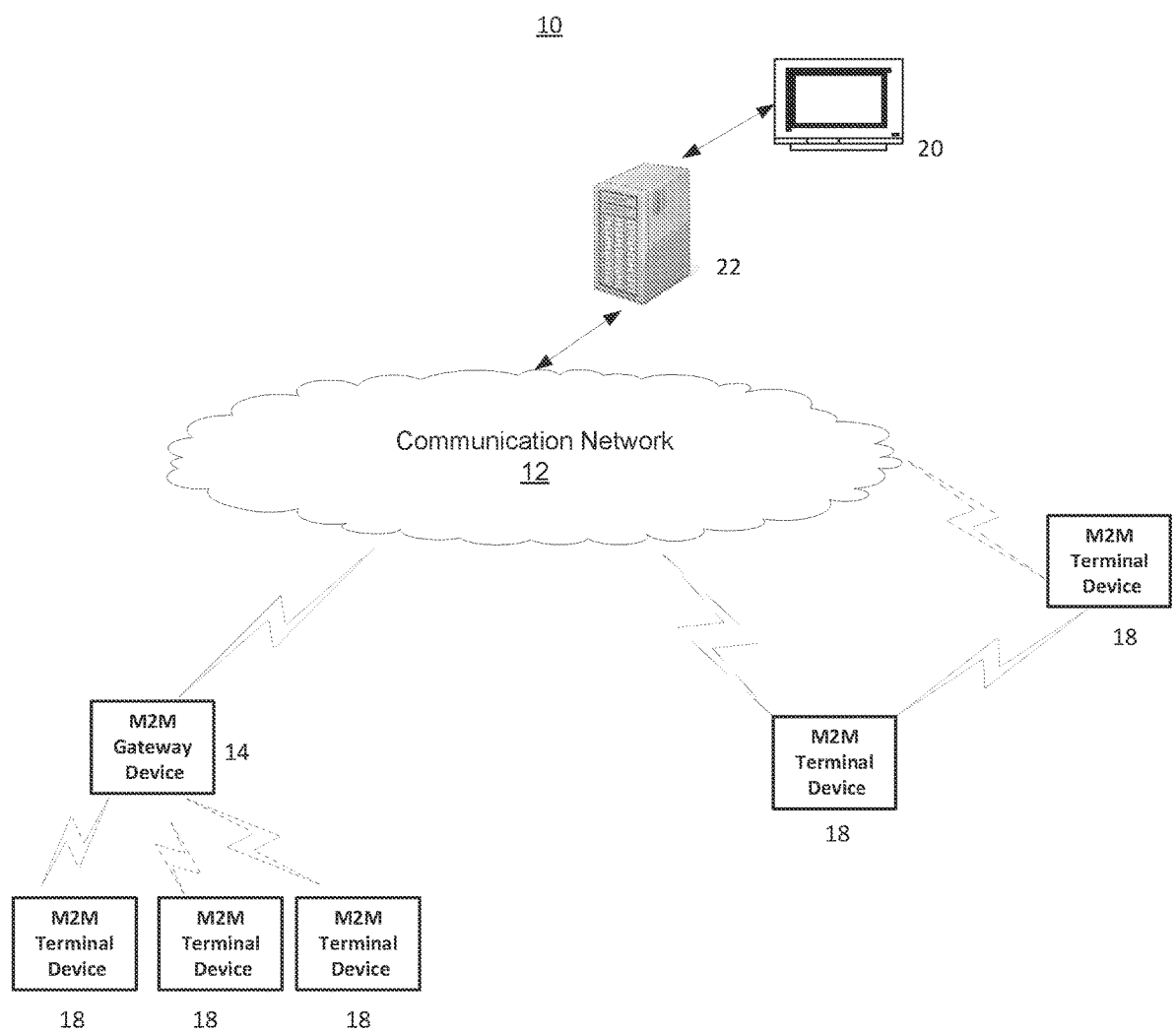
FIG. 1A illustrates an embodiment of a machine-to machine (M2M) or IoT communication system.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

The present application describes a system and techniques for selecting one or more service nodes to add a new service in view of one or more factors. According to one embodiment, a service is added based upon a service enablement policy including one or more rules. In one particular embodiment, a policy entails collaboration. In another particular embodiment, a policy entails service node selection. In yet another particular embodiment, a policy entails aggregation. In yet even another particular embodiment, a policy entails service provision. The policies described above may be defined by an ASP which may be an application entity in OneM2M. Alternatively, the policies may be defined by a common service entity (CSE) in OneM2M.

According to another embodiment, service node selection may include one or more criteria for adding a new service. For example, the criteria may include one or more of ease of service discovery, ease of utilization, load balance, etc. According to yet another embodiment, the application describes dynamic policy configuration procedures among service layer entities within a service layer owned by a service provider. In a further embodiment, the application describes collaboration procedures between an ASP and a service provider, such as for example, an owner of a service layer platform, and among service layer entities.

In yet a further embodiment, the present application describes service node selection protocols. The protocols are utilized for selecting the service node for adding the new service. This may be based upon the above-mentioned policies. The selection may also be based upon service node selection criteria.

According to even a further embodiment, protocols are described for aggregating messages to further optimize performance of adding new services.

Acronyms

The following acronyms will be used throughout the application as provided in Table 1 below.

| Term | Acronym |
|---|---|
| ACS | Auto-Configuration Server |
| ASN | Application Service Node |
| ASP | Application Service Provider |
| BBF | Broadband Forum |
| CPE | Customer Premises Equipment |
| CSE | Common Service Entity |
| CSF | Common Service Function |
| CWMP | CWP WAN Management Protocol |
| DM | Device Management |
| DMS | Device Management Server |
| E2E | End-to-End |
| IoT | Internet of Things |
| IP | Internet Protocol |
| M2M | Machine to Machine |
| NSE | Network Service Entity |
| OMA | Open Mobile Alliance |
| OSGi | Open Service Gateway Initiative |
| PLC | Power Line Communication |
| PON | Passive Optical Network |
| RFID | Radio-Frequency Identification |
| RoA | Resource Oriented Architecture |
| SC | Service Capability |
| SEF | Service Enabler Function |
| SoA | Service Oriented Architecture |
| SCL | Service Capability Layer |
| SLE | Service Layer Entity |
| SP | Service Provider |
| UPnP | Universal Plug and Play |
| VM | Virtual Machine |
| WLAN | Wireless Local Area Network |
| WPAN | Wireless Personal Area Network |
| WSN | Wireless Sensor Network |

The following terms will be used throughout the application and their customary and ordinary definitions as understood in the art are provided below:

M2M Application Service: Realized through the service logic of an M2M Application and is operated by the User or an M2M Application Service Provider.

M2M Application Service Provider: An entity, e.g., a company or an application that provides interaction between ASP and service provider over Mca in OneM2M.

M2M Service (Service): Includes one or more M2M Application Services and one or more M2M Common Services. M2M service may also be referred to as Service.

Network Node: A network addressable within a network. A network node may either be a physical, e.g., device, gateway or server, or a virtual entity, e.g., VM, in a network.

Service Node: A network node hosting a service layer supporting one or more service capabilities.

Service Layer: A software middleware layer that supports value-added service capabilities through a set of Application Programming Interfaces (APIs) and underlying networking interfaces.

Service Layer Entity: A logical object representing a middleware with a set of service capabilities at a service layer.

Service Capability: A specific type of service supported by a service layer.

Service Capability Layer: ETSI M2M term for a service layer.

Common Service Function: OneM2M term for a Service Capability.

Common Service Entity: OneM2M term for a service layer.

Service Node Selection: Process of selecting one or more multiple service nodes for hosting a new service. The selected service node(s) will provide access to other service layer entities and application for utilizing a new service.

Service Layer Client: An entity configured to access and utilize services provided by the service layer. A client could be an application, e.g., AE in oneM2M service layer, or a service layer entity, e.g., CSE in oneM2M terms.

M2M Service Provider: An entity, e.g., a company that provides M2M Common Services to a M2M Application Service Provider or to the user. A service provider owns and controls the service platforms, such as CSEs. Operation are over Mcc and Mcc'.

Platforms

This application is intended to cover platform functionality and support for both application enablement platforms (AEPs) and connected device platforms (CDPs). AEPs include an application enablement layer and a service layer including the World Wide Web and Internet. The application enablement layer includes but is not limited to the following: (i) servicing APIs, rules/scripting engine; (ii) SDK programming interface; and (iii) enterprise systems integration. The application enablement layer may also include value-added services including but not limited to discovery, analytics, context and events. The service layer including the world wide web and Internet may comprise, for example, analytics, billing, raw APIs, web service interfaces, semantic data models, device/service discovery, device management, security, data collection, data adaptation, aggregation, event management, context management, optimized connectivity and transport, M2M gateway, and addressing and identification. The CDPs may include connectivity analysis, usage analysis/reporting/alerts, policy control, automated provisioning, SIM activation/deactivation, and subscription Activation/Deactivation.

General Architecture

FIG. 1A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 1A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 1A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a Backbone router with a proxy, and terminal devices 18, such as LLN devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. In one embodiment, the service layer 22 may be a PCE. M2M devices 18 and gateways 14 may communicate via various networks including, cellular, WLAN, WPAN, e.g., Zigbee, 6LoWPAN, Bluetooth, direct radio link, and wireline for example.

Figure 1B:
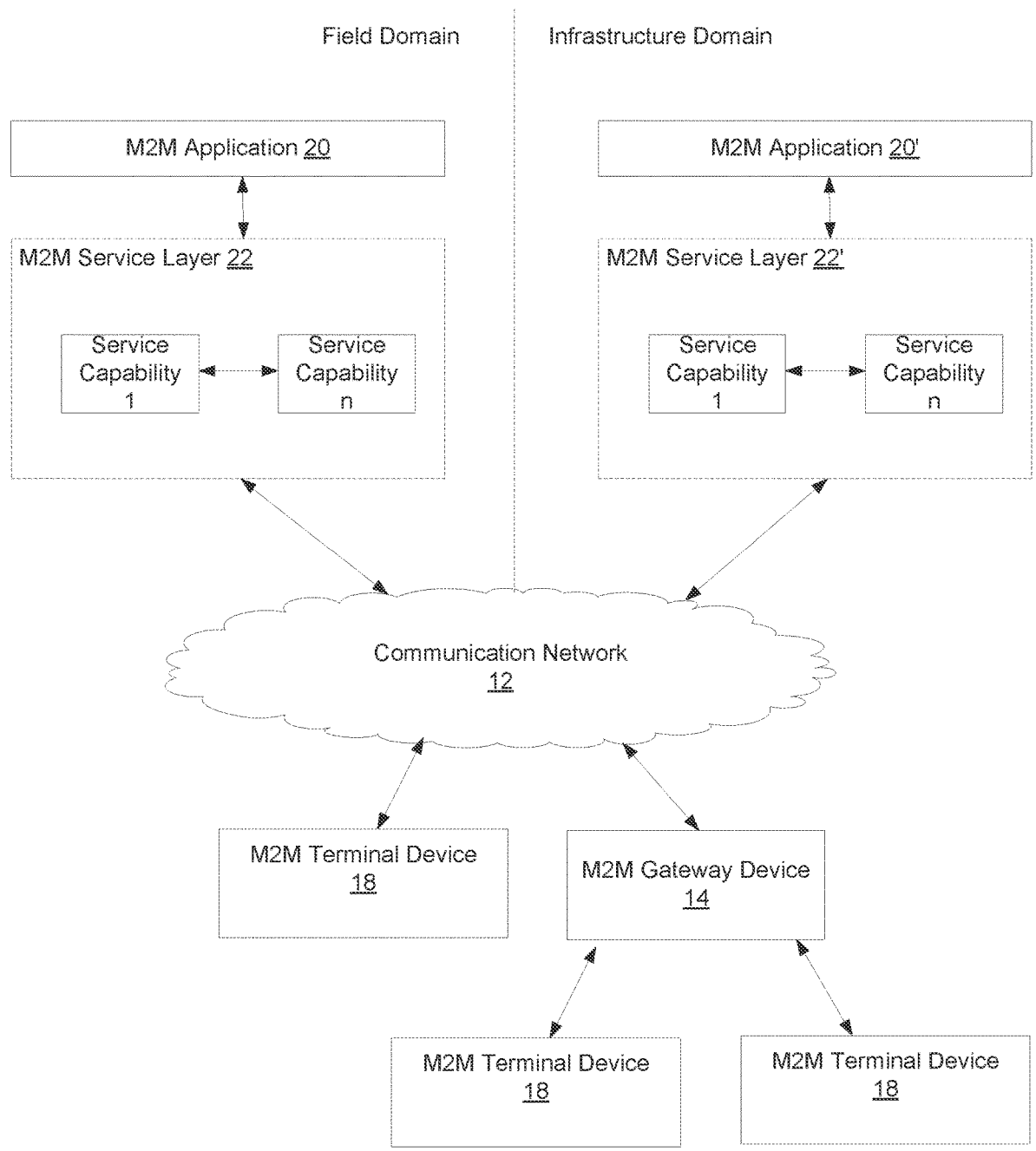
FIG. 1B illustrates an embodiment of the application of a M2M service platform.

Referring to FIG. 1B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, M2M gateway, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 1B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'. Moreover, the M2M service layer may also be configured to interface with other devices such as mobile devices and M2M servers/gateways as discussed in this application and illustrated in the figures.

According to an aspect of the application, the method of managing registration may be implemented as part of a service layer. The service layer is a software middleware layer that supports value-added service capabilities through a set of Application Programming Interfaces (APIs) and underlying networking interfaces. Both ETSI M2M and oneM2M use a service layer that may contain this method. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE) which can be hosted on different types of network nodes, e.g., infrastructure node, middle node, application-specific node. Further, the method of searching and discovering service layers as described in the present application can be implemented as part of an M2M network that uses a Service Oriented Architecture (SOA) and/or a resource-oriented architecture (ROA) to access services related to management of discovery, registration and de-registration from a service layer.

Figure 1C:
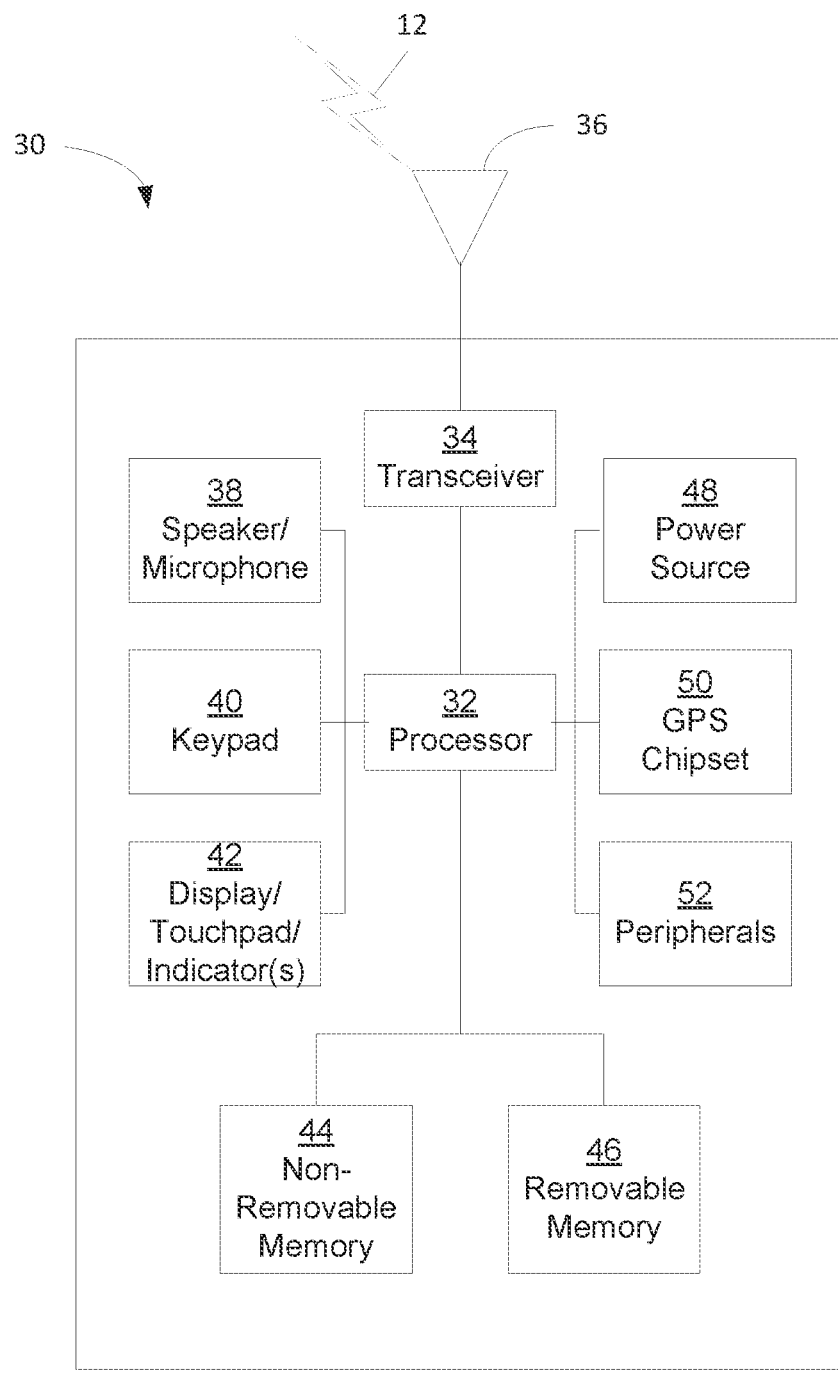
FIG. 1C illustrates an embodiment of the application of a system diagram of an example M2M device.

FIG. 1C is a system diagram of an example M2M device 30, such as a M2M terminal device 18 or an M2M gateway device 14 for example. As shown in FIG. 1C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for embedded semantics naming of sensory data. The M2M device 30 may also be employed with other devices, including for example, mobile devices as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 1C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
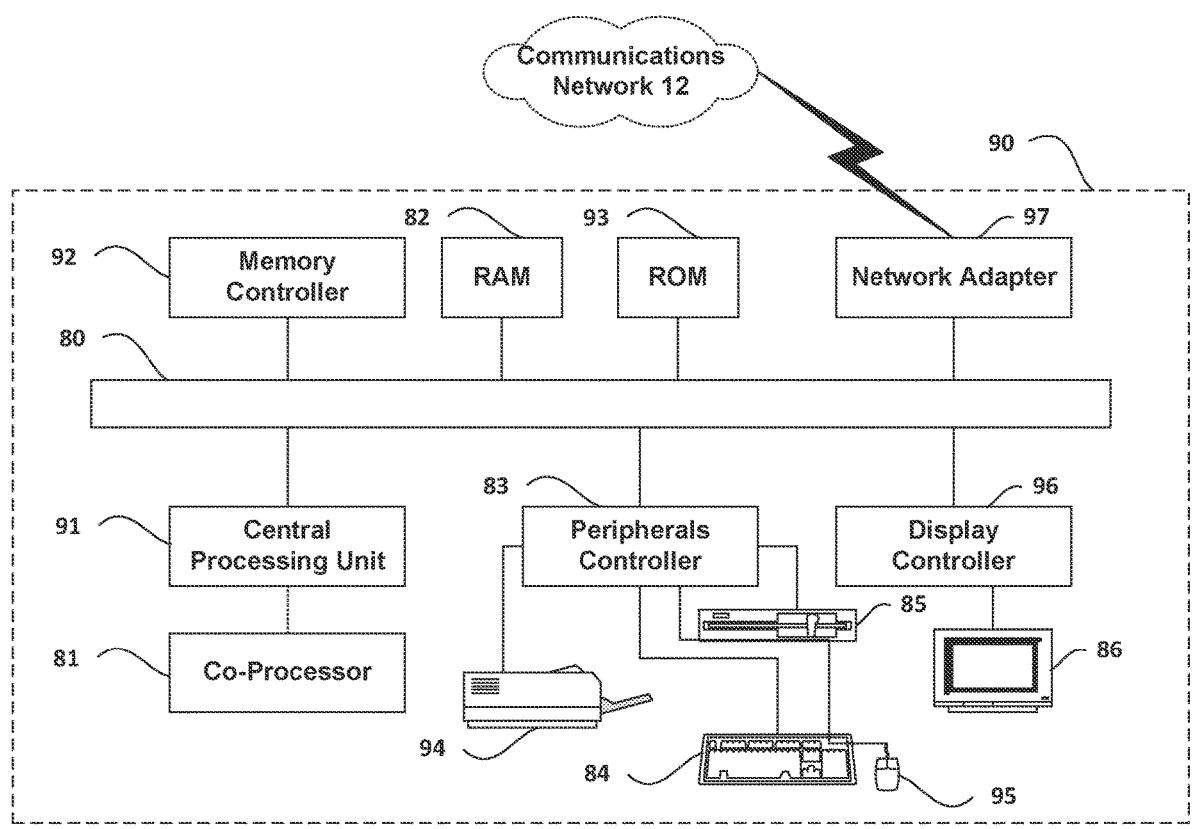
FIG. 1D illustrates an embodiment of the application of a block diagram of an exemplary computing system.

FIG. 1D is a block diagram of an exemplary computing system 90 on which, for example, the M2M service platform 22 of FIG. 1A and FIG. 1B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 1A and FIG. 1B. The display 86 may include a graphical user interface (GUI), such as for example, the GUI shown in FIG. 20 described in more detail below.

It is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Service Layer

The term "service layer" refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Figure 2:
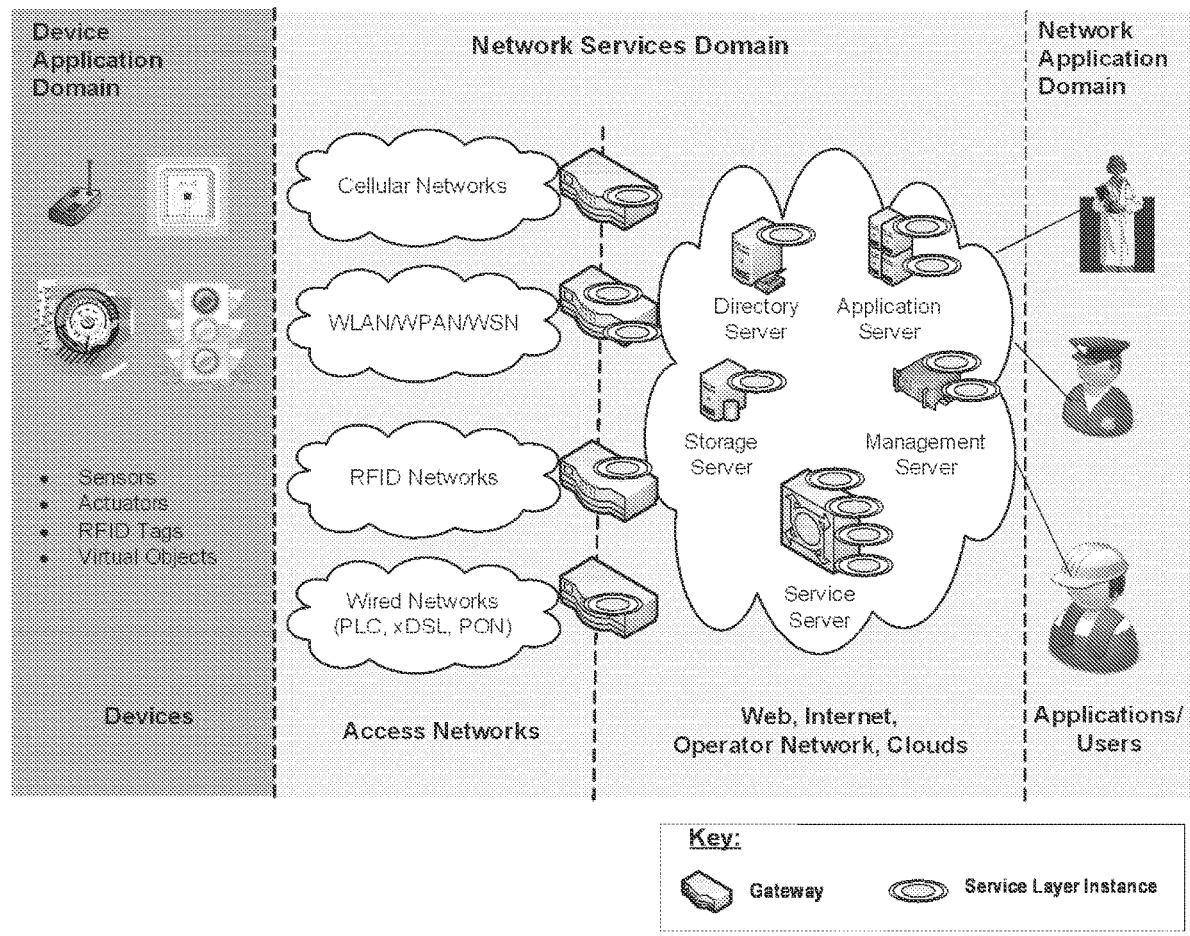
FIG. 2 illustrates a service layer deployment within a network according to an embodiment of the application.

According to an embodiment, FIG. 2 illustrates a deployment scenario of a system 200 including a service layer 210 within a network—network services domain 205—of a system 200. The service layer is deployed on various network nodes—gateways and servers—to provide value-added services to network applications, the web, Internet, Operator Networks, the Cloud, device applications as well as to the network nodes themselves. In FIG. 2, the gateways may include cellular networks, WLAN/WPAN/WSN, RFID networks and wired networks such as PLC, xDSL and PON. The servers may include a directory server, application server, storage server, management server and service server. The system 200 may also include a device application domain (DAD) 220 including sensors, actuators, RFID tags and virtual objections. The system 200 may include a network application domain 230 including applications and users.

In one embodiment, an M2M/IoT service layer is an example of one type of service layer specifically targeted to providing value-added services for M2M/IoT type devices and applications. Several industry standards bodies, e.g., ETSI M2M and oneM2M, have been developing M2M/IoT service layers to address the challenges associated with integration of M2M/IoT types of devices and applications into deployments such as the Internet/Web, cellular, enterprise, and home network. An M2M service layer can provide applications and devices access to a collection of M2M centric capabilities supported by the service layer. A few examples include security, charging, data management, device management, discovery, provisioning, and connectivity management. These capabilities are made available to applications via APIs which make use of message formats, resource structures and resource representations defined by the M2M service layer.

OneM2M Service Layer

Figure 3:
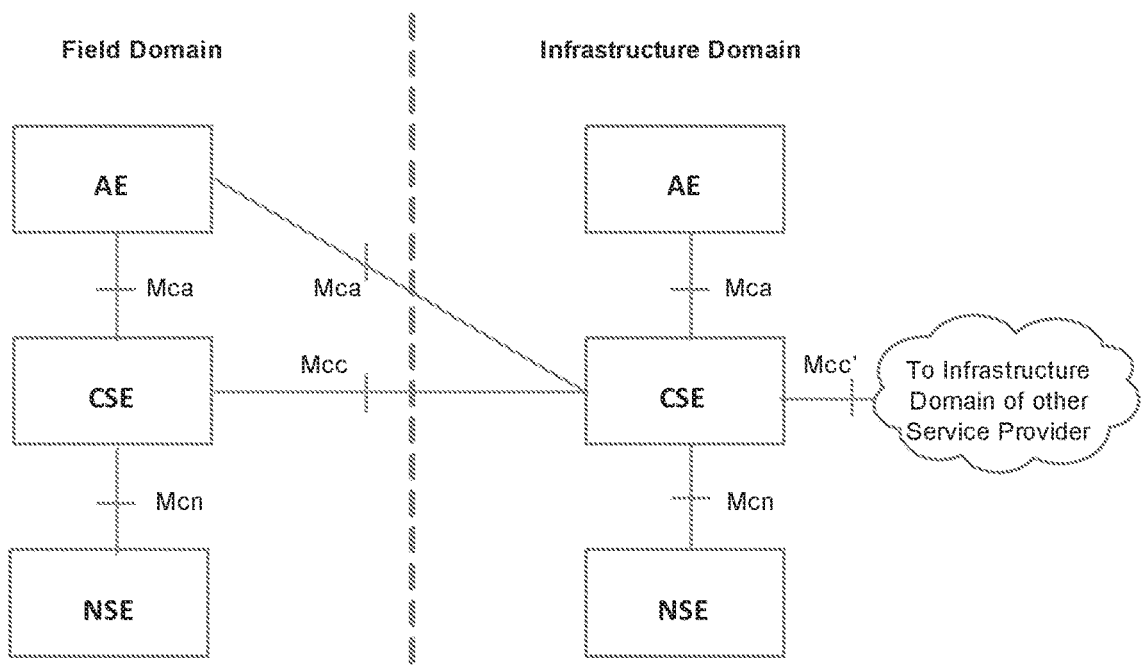
FIG. 3 illustrates an oneM2M service layer function architecture (RoA) according to an embodiment of the application.

In another embodiment, oneM2M is employed to develop technical specifications that address the needs for a common M2M Service Layer that can be readily embedded within various hardware and software. In addition, it can be relied upon to connect a wide variety of devices in the field with M2M application servers worldwide. The one M2M common services layer supports a set of Common Service Functions (CSFs), e.g., service capabilities, as shown in FIG. 3. An instantiation of a set of one or more particular types of CSFs is referred to as a Common Services Entity (CSE) which can be hosted on different types of network nodes, e.g., infrastructure node, middle node, application-specific node. As shown, the CSE is hosted in the Field domain and the infrastructure domain.

According to another embodiment, OneM2m is developing the service layer in two architectural approaches—Resource Oriented Architecture (RoA) and Service Oriented Architecture (SoA). In the oneM2M RoA RESTful architecture, CSFs are represented as a set of "resources." A resource is defined as a uniquely addressable element in the architecture having a representation that can be manipulated via RESTful methods such as Create, Retrieve, Update, and Delete. These resources are made addressable using Universal Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

Figure 4:
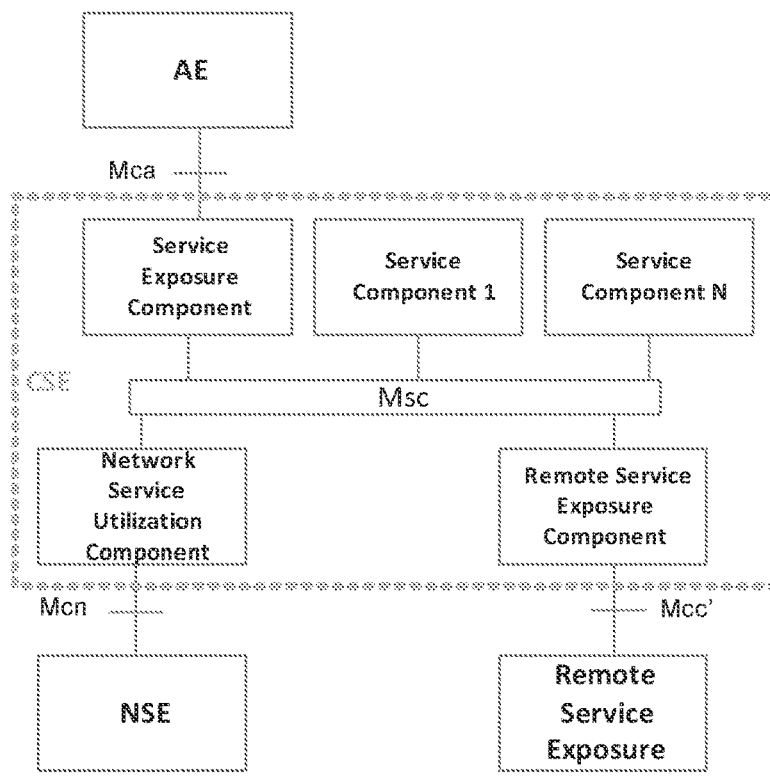
FIG. 4 illustrates a oneM2M service architecture (SoA) of the application.

On the other hand, the SoA architecture legacy deployment is not RESTful based. Rather, it re-uses largely the same service layer architecture as shown in FIG. 4. Here, the CSE is indicated by a dotted line. The CSE includes various M2M services including, for example, a service exposure component, a service component I, a service component N, a network service utilization component and a remote service exposure component. In addition to existing reference points, the CSE may include an inter-service reference point Msc. Communications between M2M Service components passing over the Msc reference point utilize a web services approach, e.g., Web Services Message Exchange Patterns (MEP).

Device Management (DM) Protocols

As generally understood in the art, DM protocols provide the dynamic device management functions, such as firmware management and software module management on a device. For instance, OM ADM is a protocol for device management designed by Open Mobile Alliance. It's widely used in the remote management of mobile devices. It is composed of a number of specifications including protocol, architecture, underlying network binding etc. In the most common scenario, by implementing OMA DM specifications, the DM Server is able to do remote management on devices with DM Clients such as for example mobile phones. These devices may also include sensors, actuators, and gateways. With implementation of the Management Object and the DM Client, the DM Server can perform remote management on devices.

Another DM protocol is the Software Component Management Object (SCOMO). SCOMO enables remote software component management within a device. Management may include but is not limited to functions such as downloading, installation, updating, removal, activation/de-activation and retrieval of inventory of software component(s).

Yet another DM protocol is BBF TR-069. This protocol defines CWMP protocol between a Customer Premises Equipment (CPE) and on Auto-Configuration Server (ACS). ACS is a centralized server in the network, while CPE may include home routers, set-top boxes, and end devices. The CWMP manages a set of CPE devices including but not limited to the following functions: (i) Auto-configuration and dynamic service provisioning; (ii) Software/firmware image management; (iii) Status and performance monitoring; and (iv) Diagnostics. The software module management enables the management of modular software and execution environment, including software module install, update, uninstall and notification. The software module management also has the ability to start and stop applications on CPE, enable and disable execution environments, and inventory the available software module on the device.

A further DM protocol includes a Device Management (DMG) CSF in CSE. This is responsible for providing management of device capabilities on Middle Nodes (M2M Gateways), Application Service Nodes and Application Dedicated Nodes (M2M Devices) as well as devices that reside within an M2M Area network. The DMG may utilize existing device management technologies, e.g., TR-069 and OMA-DM, in addition to management of a CSE across the Mcc reference point. To perform the translation and adaptation functions, the DMG has a functional component called a Management Adapter. The Management Adapter performs the adaptation between the DMG and Management Servers (or Management Client) in the underlying NSE.

There is a Device Management (DMG) CSF in CSE which is responsible for providing management of device capabilities on Middle Nodes (e.g. M2M Gateways), Application Service Nodes and Application Dedicated Nodes (e.g. M2M Devices) as well as devices that reside within an M2M Area network. The DMG may utilize existing device management technologies (e.g., BBF TR-069 and OMA DM) in addition to management of a CSE across the Mcc reference point. To perform the translation and adaptation functions, the DMG has a functional component termed as the Management Adapter. The Management Adapter in the DMG performs the adaptation between the DMG and Management Servers (or Management Client) in the underlying NSE.

Service Extension Enabler in oneM2M

Figure 5:
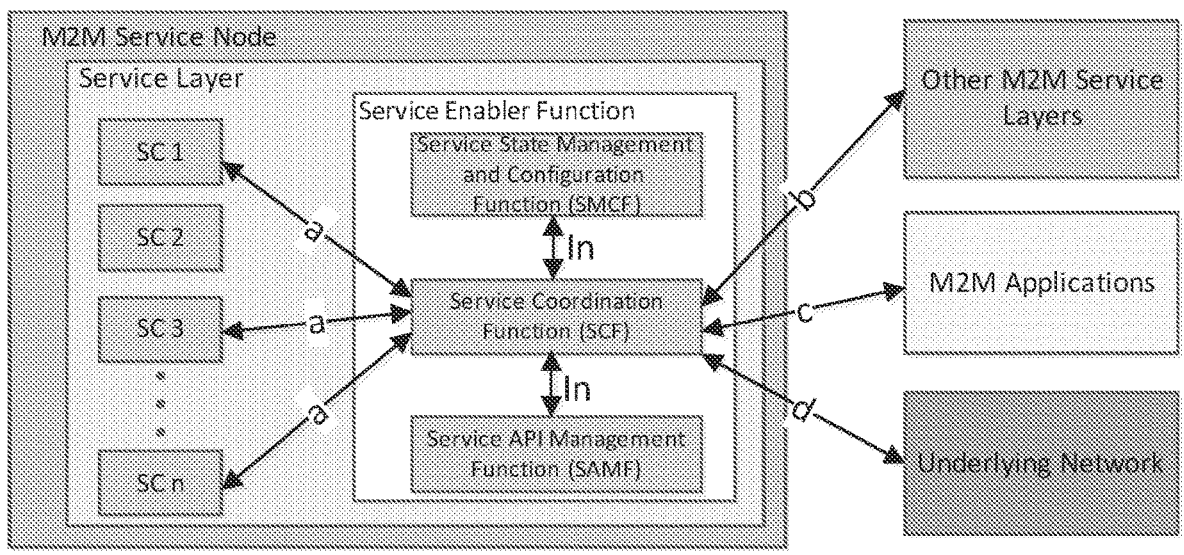
FIG. 5 illustrates a service enabler function (SEF) architecture according to an embodiment of the application.

According to one aspect of the application, as illustrated in FIG. 5, for example, there is an architectural view of Service Enabler Function 510 at the service layer 500. It may provide the following high level functionalities: (i) check module authentication; (ii) check node resources; (iii) check interoperability with existing modules; (iv) check policy and rights to determine how to handle conflicts e.g., do not register new module or deregister existing module, etc.; (v) register new module; (vi) add new service(s) due to new module to list of services; (vii) modify API support to reflect new service capabilities; and (viii) modify inter-module communications to incorporate new module. In one embodiment, registration and security services may be employed to add/activate/deactivate/remove any service. The SEF includes sub-functions and communications with network entities, e.g., service capability, M2M applications and M2M service layers, over reference points. The Service Enabler Function includes three (3) main sub-functions described below in more detail.

The first sub-function is a Service State Management and Configuration Function (SMCF) 511. The role of the SMCF is to manage the state transition of a service at a service layer, and to configure the capabilities and features of the service. If there are multiple versions of a service, SMCF is responsible for managing the status and configuration of each version of the service.

The second sub-function is a Service Coordination Function (SCF) 512. The role of SCF is to coordinate process and communications between Service Enabler Function and service capabilities, M2M applications and other M2M service layers when Service Enabler Function leads the effort for adding, activating, deactivating or removing a service. In addition, SCF cooperates with SMCF and SAMF within the Service Enabler Function.

The third sub-function is a Service API Management Function (SAMF) 513. The role of SAMF is to dynamically manage the service API when a service is added, activated, deactivated or removed. Service API implies the functionality and features of a service. Clients such as for example, application or other service layers, may recognize a service by retrieving information from the Service API, and utilize the service by accessing the service API. Different services may have different service APIs, which are defined by the entity providing the service. In one embodiment, accessing the service API and determining where the service API resides are performed by the service layer, and not by service API itself For example, the service API of a SoA-based temperature reporting service may be configured to retrieve the temperature with the location and time as parameters. In addition, the service API could also provide the function that calculates the average temperature and returns the highest/lowest temperature with starting time and ending time as parameters. Another example is the RoA-based location service, and the service API provides a list of resources wherein the access control attribute defines a set of users that are allowed to retrieve the location information, and the frequency attribute indicates how often to report and update the latest location.

Figure 6A:
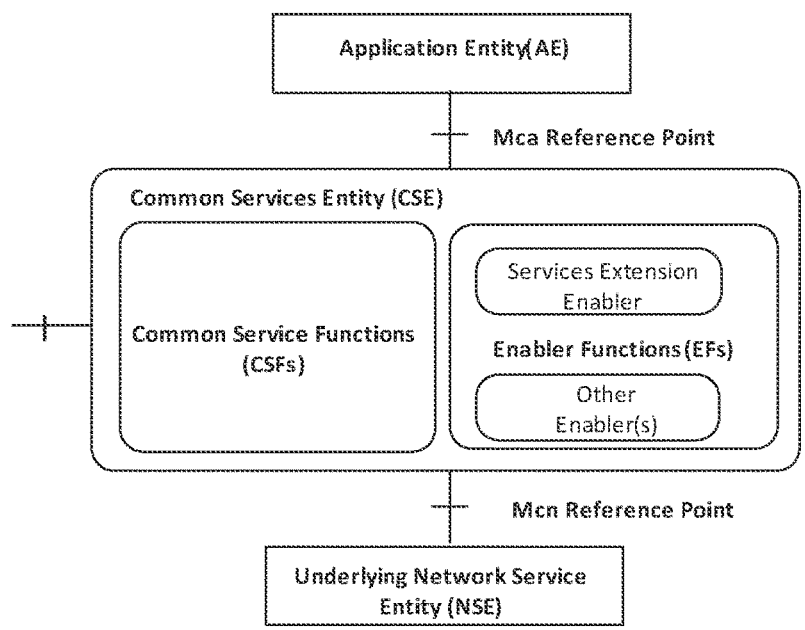
FIG. 6A illustrates enabler functions in a common service entity according to an embodiment of the application.
Figure 6B:
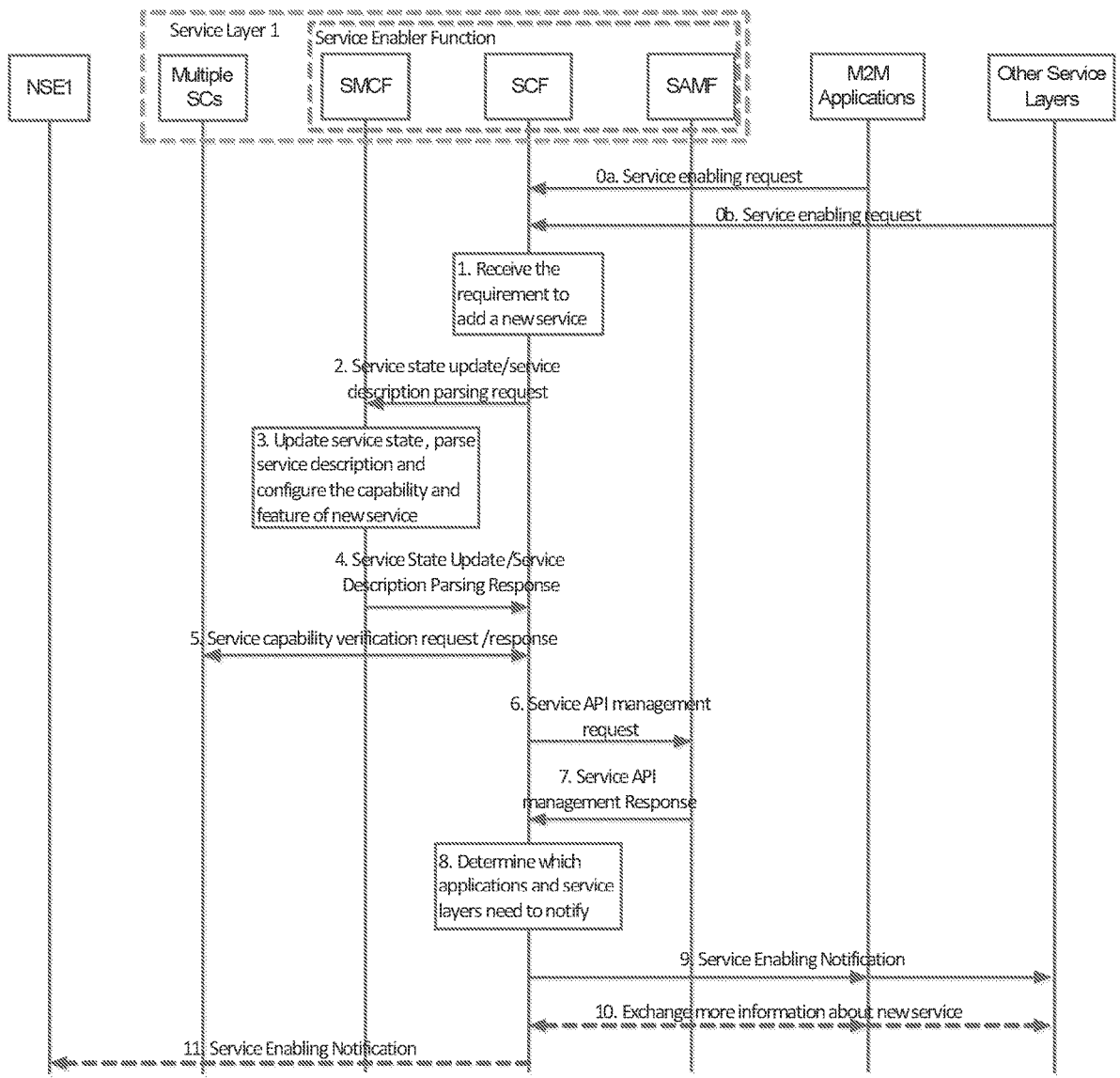
FIG. 6B illustrates a procedure for adding a new service by a service enabler function according to an embodiment of the application.

According to another embodiment as illustrated in FIG. 6, the CSE 620 includes CSF 621, a service extension enabler 622 and other enabler functions 623. The CSE communication with the application entity 610 via Mca reference point 615. The CSE 620 is also in communication with the underlying network service entity 630 via Mcn reference point 625.

Adding a New Service

Figure 7:
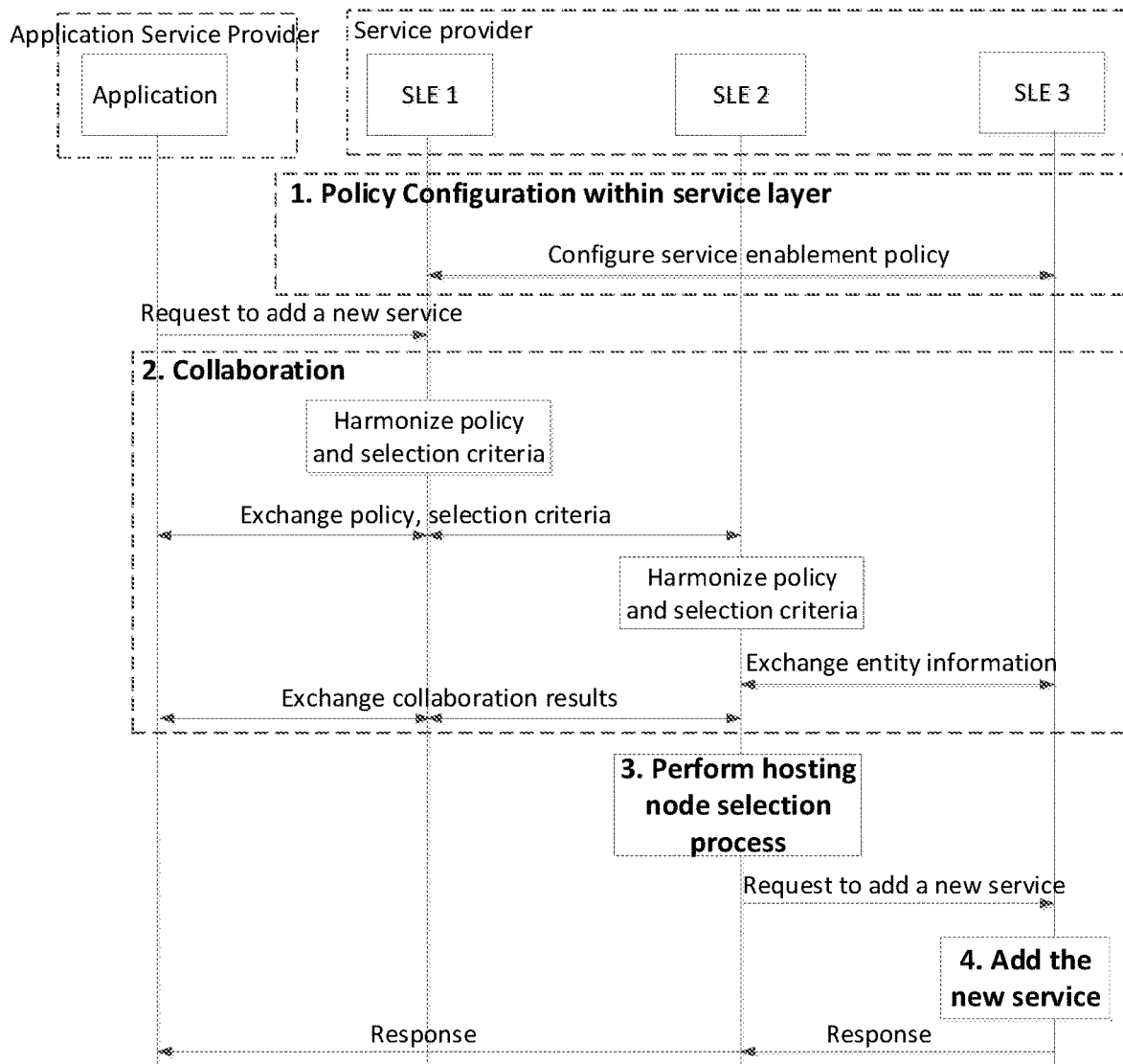
FIG. 7 illustrates a procedure for adding a new service provided by an application service provider according to another embodiment of the application.

According to an aspect of the application, protocols for selecting a service layer entity/node to add a new service are described. These protocols include policy configuration, collaboration and service node selection processes. As will be described in more detail herein, service enablement policies and service node selection criteria are defined for facilitating these processes. According to one embodiment a process for adding new services into a service layer is shown in FIG. 7. Specifically, an application service is defined by an application service provider (ASP), and a service layer entity SLE 2 initiates policy configurations within a service provider's network and performs service node selection. SLE 3 is selected to add the new service in the service layer. The following main processes may be performed as denoted by Roman numerals in FIG. 7. Process 1 describes policy configuration within the service layer. The objective is to configure the service enablement policy in a service layer which is the service provider's network. By so doing, each service layer entity maintains the service provider's policy, which is general for all the services. Both ASP and service provider could define the policy. It is noted that this process takes place only in the service layer. That is, the service provider configures its policy throughout the service layer it owns.

According to another embodiment, process 2 describes collaboration protocols as shown in FIG. 7. Specifically, once the Service Layer Entity (SLE) 1 receives a request of adding a new service from the ASP, it starts the collaboration protocol with SLE 2 because the service enablement policy and selection criteria specified by ASP may conflict. Therefore SLE 1 and/or 2 may harmonize the service enablement policy and selection criteria to resolve the conflict. In addition, SLE 2 may collaborate with SLE 3 for getting more information. The information may include the capability and willingness of SLE 3 to add and host the new service prior to selecting the service node to add the new service. According to one embodiment, the exchange of policies occurs between the ASP and the SLE 1. Next service node selection criteria collaboration is initiated. Here, service node selection criteria are defined as a set of preferences/rules used for selecting the service node to add the new service. Both ASP and service provider could define the selection criteria. In addition, collaboration procedures also include retrieving information of other service layer entities. The information obtained will be used by the service node selection process, which may result in a better choice of service node for adding the new service.

According to yet another embodiment, Process 3 describes a hosting node selection process. This is based on the information obtained through the collaboration process. Specifically, SLE 2 performs the service node selection process to select the service node to add the new service. In yet even another embodiment, Process 4 as illustrated in FIG. 7, is the step of adding the new service whereby SLE 3 adds the new service into service layer platform. It is noted that each process may consist of multiple steps, and could either be performed as a standalone process or together. As illustrated in FIG. 7, the new service is defined by an application, e.g., ASP, so collaboration is required in order to resolve the potential policy and selection criteria conflicts between ASP and service layer owned by the service provider. It is envisaged according to the application that instances may arise when conflicts will need to be resolved as will be described in more detail below.

According to another embodiment, the service provider itself may define a new service. As illustrated, for example in FIG. 8, a process for adding a new service by the service provider owning the service layer is provided. Since the service provider is the owner and manager of the service layer, the entity defining the new service will not specify any policy and criteria which is already configured via Process 1. Accordingly, harmonization during the collaboration process is not necessary. According to an embodiment, involving ASP for example, it is possible that ASP provides a new service and also hosts the new service while service layer acts as proxy between ASP and the service layer clients for accessing and utilizing the new service.

Service Enablement Policy

According to another embodiment, the service enablement policy is defined as a set of rules to be followed by all of the service layer entities during the process of adding a new service. This is shown, for example, in FIGS. 7 and 8. This may include a policy defined by an ASP and/or a service provider and maintained by a SLE within the service provider's network. This may include two stages of configuring the policy. The first stage may include, for example, a service provider configuring a policy on one or more service layer entities. This usually happens at the very beginning in a pre-configured manner. The second stage may include service layer entities in a service provider's network harmonizing the policy during the collaboration process when an ASP specifies some policies and defines a new service. According to the application, harmonization implies the operations of modifying policy when both ASP and service provider specify some policies that conflict with each other.

The service enablement policy could be classified as four types. Examples are provided in Table 2 below.

TABLE 2

| Type | Policy Parameter | Example Value | Description |
| --- | --- | --- | --- |
| 1 | Collaboration enablement indication | Enabled | Collaboration is enabled |
|  | Collaboration scope | Same domain | Collaboration takes place only in the service domain that application service provider registered with |
|  | Eligible collaboration entity | Any service layer entity |  |
|  | Collaboration content | Service node selection criteria | Selection criteria could be involved in collaboration process, while service enablement policy cannot be involved in collaboration |
| 2 | Service node scope | Same domain | Only the service node that registers with the same service layer as application service provider could be selected to add the new service |
|  | Eligible service node | M2M server with charging function | Only M2M server with charging function could be selected to add the new service |
|  | Maximum service node number | 3 | up to 3 service nodes to add new service |
|  | Minimum service node number | 1 | at least 1 service nodes to add new service |
|  | Maximum distance to application service provider | 2 hops | Selected service node should be within 2 hops aware from the application service provider. |
|  | Service node selection enable | Enabled | Service node selection is enabled |
|  | Eligible selection entity type | IN M2M server | Only M2M server in infrastructure field could perform the service node selection process |
|  | Application Service provider confirm | Yes | Application service provider needs to be notified and confirm the selection results before adding the new service; 'No' means application service provider does not need to confirm |
| 3 | Aggregation enable | Enabled | Aggregation is enabled |
|  | Eligible aggregation entity type | M2M server | Only M2M server could perform the aggregation |

TABLE 2-continued

| Type | Policy Parameter | Example Value | Description |
|---|---|---|---|
| | Aggregation window | 2 minutes | requests received in every 2 minutes could be aggregated |
| | Allowed aggregation scenarios | N messages to 1 entity & 1 message to N entities | (it is allowed to aggregate multiple messages destined to 1 service layer entity, and aggregate 1 message destined to multiple entities, i.e., multicast) |
| 4 | Service provision scope | Same domain | The service is provided to the clients that register with the same service layer as the application service provider |
| | List of clients with access right | IDs of a set of applications | A list of service layer clients or a list of categories of clients that are permitted to access/utilize the new service |

Type 1 is the policy for collaboration. This type of policy is configured for guiding the collaboration process which may include, but is not limited to, the following contents:

Collaboration enablement indication: indicates if the collaboration among service layer entities is enabled for adding a new service into the service layer platform. Sometimes, service provider/application service provider may not want to expose the service information throughout the whole network. In other words, the service is only discoverable within a subset of network. For example, a new data storage service is provided to local clients registered with a gateway, thus there is no need to reveal any information beyond the scope. If the indication is set as enabled, then the service layer entity which the application service provider registers with would initiate the collaboration process with regard to the policy and service node criteria.

Eligible collaboration entity type: specify the type of service layer entity that could be involved in the collaboration process.

Collaboration scope: indicate the scope in which the collaboration process could take place. If the collaboration enablement indication is set to "true", then this defines the range of collaboration.

Collaboration content: indicate what type of contents/information could be exchanged during the collaboration process.

Collaboration trigger conditions: indicate some scenarios that may trigger the collaboration process.

Type 2 is the policy for service node selection. This policy is defined and used for a service node selection process that includes, but is not limited to, the following contents:

Service node scope: indicate the scope/service domain in which a service node could be selected to add the new service.

Eligible service node type: indicate the type of eligible service node to add the new service Maximum service node number: indicate the maximum number of service nodes that could add the new service in service layer.

Minimum service node number: indicate the minimum number of service nodes that adds the new service Maximum distance to service provider/application service provider: indicate the upper limit of distance from the node adding the new service to the service provider/application service provider. The "distance" could be specified in different ways, e.g., number of hops, such that the data report is easier without transporting the data many hops away, or to avoid having too many hops.

Maximum distance to service layer clients: indicate the upper limit of distance from the node adding the new service to the service layer clients, i.e., service consumer.

Service node selection enable: indicate if service node selection is enabled or not for the new service.

Eligible selection entity: specify the type of entity that is eligible to perform service node selection process.

Service provider confirm: indicate if the application service provider/service provider needs to confirm the service node selection results after some service nodes are selected to add the new service by service node selection process.

Type 3 is the policy for aggregating messages of adding multiple new services. This category of policy is defined and maintained for aggregation of messages when adding new services, which includes, but is not limited to, the following contents:

Aggregation enable: indicate if aggregation is enabled when adding multiple new services.

Eligible aggregation entity: indicate what type of service layer entity is entitled to do aggregation. For example, only M2M server is allowed to do so, or only infrastructure node is allowed to do aggregation.

Aggregation window: indicate a period of time, such that the requests which are received during aggregation window could be considered for aggregation.

Enabled aggregation scenario: indicate what types of aggregation operations are enabled. In other words, this parameter specifies a set of scenarios for which aggregation is enabled.

Type 4 is the policy for accessing/utilizing the new service. This category of policy is defined and maintained for accessing and utilizing a new service, which may include, but is not limited to, the following contents:

Service provision scope: indicates the scope for which the new service is supposed to provide. In other words, this indicates that only the clients within the specified scope could access and utilize the service. This may be different from the scope of collaboration. For example, a new proximity advertising service is provided within a local area, so that all the information and processing of adding the new service could be handled by the entity, e.g., gateway and server, that stays in the corresponding local network.

List of clients with access right: indicates a list of service layer clients or a list of categories of clients that are permitted to access/utilize the new service. The list could contain several service layer identifiers of individual clients, or contain general types of client, e.g., infrastructure server.

Figure 8:
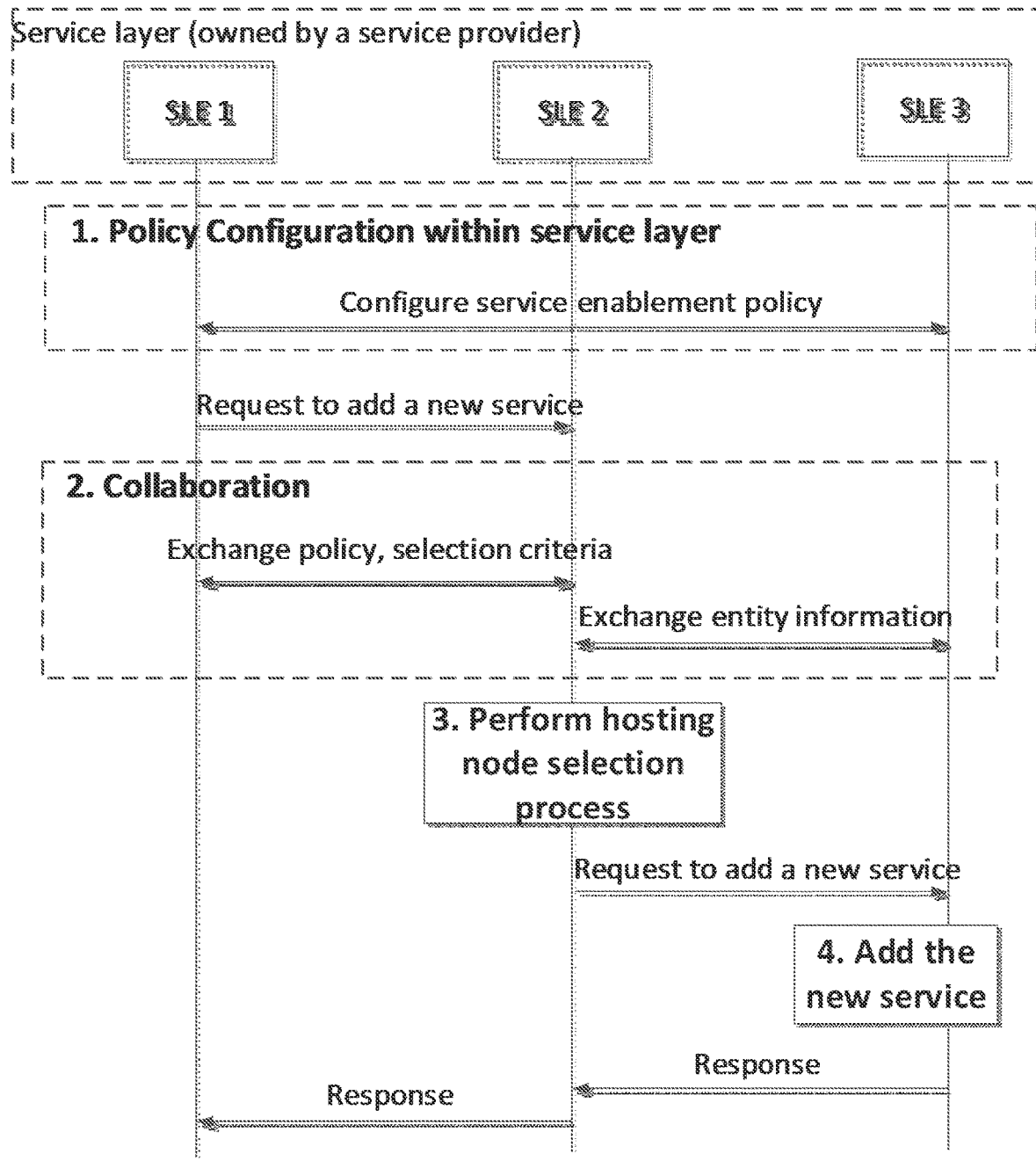
FIG. 8 illustrates a procedure for adding a new service provided by a service provider according to another embodiment of the application.
Figure 9:
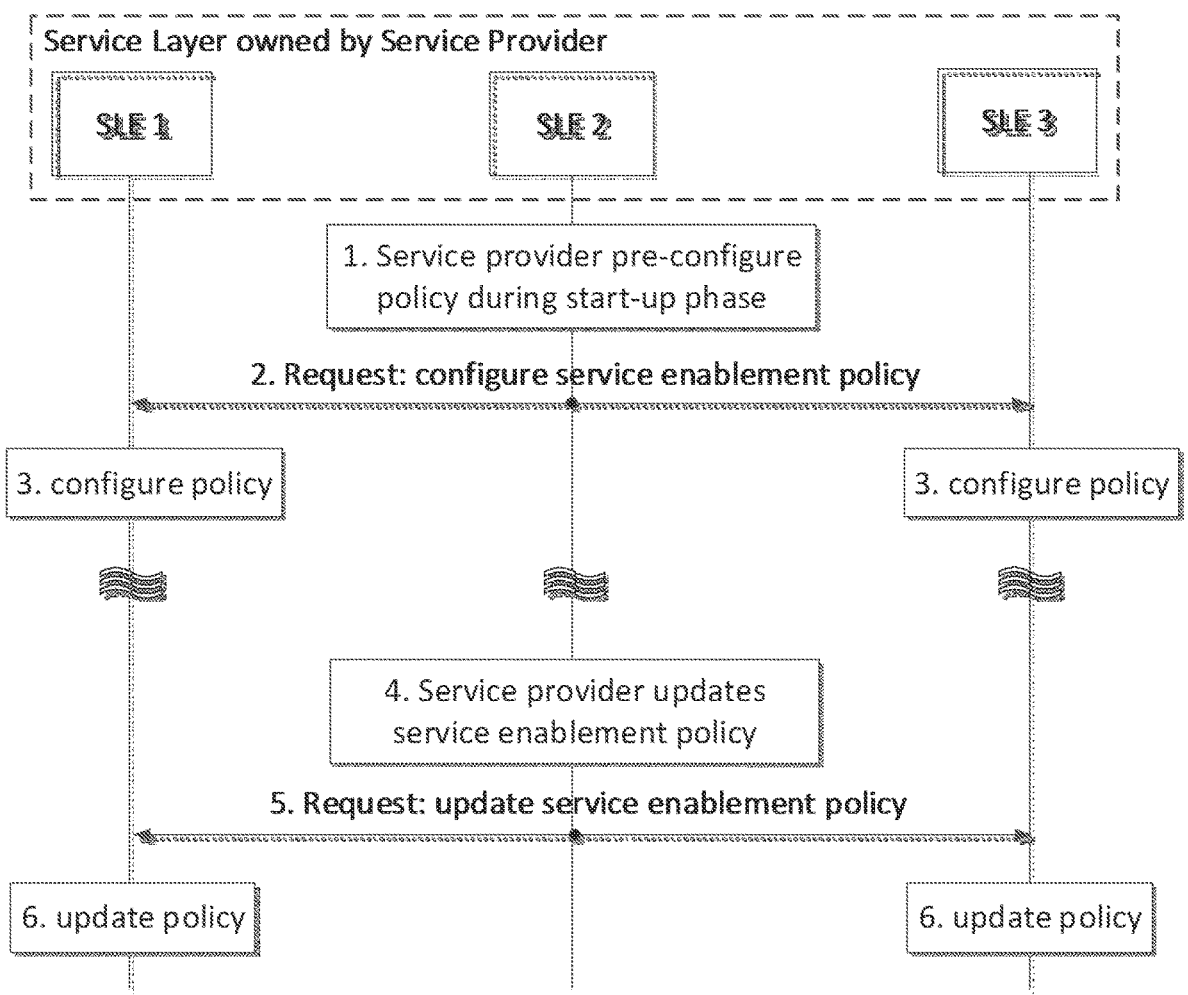
FIG. 9 illustrates a procedure for configuring/updating a service enablement policy by a service provider according to an embodiment of the application.

According to another embodiment, during the first stage of policy configuration shown as process 1 in FIGS. 7 and 8, each service provider will configure the service enablement policy among service layer entities in its own service layer platform. This process may happen during the service layer start-up phase, and the time when the service provider would like to update any service enablement policy as shown in FIG. 9. The service provider is assumed to pre-provision a set of policies to SLE 2, which then populates the pre-configured policy throughout the service layer owned by the service provider. Most likely, the service provider will first pre-configure the service layer entity in an infrastructure field. According to the application, the policy configuration request may carry a subset of the service provider's service enablement policy depending on the role of each SLE. For example, in oneM2M, if SLE 2 is IN-CSE in the infrastructure domain, while SLE 1 is an ASN-CSE in the field domain, then SLE 2 may include a subset of the service enablement policy in the request that is allowed to be shown to an ASN-CSE in the field domain.

Service Node Selection Criteria

According to yet even another embodiment, service node selection criteria is defined as a set of rules for selecting the service node to add the new service. The application service provider could specify a set of criteria for a new service in order to facilitate the service node selection process. If there is no criterion specified by the ASP, the SLE, i.e., service provider, performing the service node selection process would follow some default criteria. Based on this, there are some pre-defined and populated criteria among SLEs of a service provider, which is general for all services within that service domain. The procedure of configuring and populating the selection criteria is similar to that for a service enablement policy described above. In addition, the harmonization of selection criteria will be presented below in more detail to resolve potential conflicts between ASP and the service layer, e.g., service provider.

According to yet another embodiment, the service node selection criteria may be related to one or more of the following aspects:

Service Node Location: indicates location requirement for the potential service node to add the new service, i.e., where the potential service node could be. For example, a service provider could explicitly require that the service node has to stay within 2 hops away from the service provider.

Service Domain Requirement: indicates in which service domain a service node may be selected to add the new service.

Access Control: indicates access control requirement when selecting the service node. For example, the service provider may require that the service node has to grant full access right, e.g., CRUDN, to it. Another example is that the service provider requires the service node to grant at least RETRIEVE right to the cross-domain clients, e.g., new service could be discovered by those clients.

Underlying Network Protocol: indicates the criteria as preference/requirement for the underlying network protocol when selecting the service node. For example, the service node to add the new service may be required to support CoAP and/or MQTT protocol.

Device Management: indicates the requirement for the service node in terms of device management protocol. This may be related to the potential service update in the future. For example, a new data analytics service expects several updated versions in the coming future, so it may prefer the host to support software module upgrade functionality defined by OMA DM protocol or BBF TR-069 protocol.

Load Balance: indicates the load balance requirement for selecting the service node. For example, the potential host may be required to process no more than 2 GB data per second currently, or its computation capacity to be idle no less than 50% currently.

Service Node Type: indicates the types of service layer entity (e.g. M2M gateway and/or M2M server) that is eligible to add the new service. This criterion could also indicate if cross-domain service node is possible to add the new service. The service provider configures this rule by considering the capability and security requirement of the new service. For example, a new data analytics service requires a large amount of storage and computation resource, therefore a server with large storage and powerful computation capability is preferred to a proxy gateway for hosting the new service.

API Support: indicate the preference over host candidates in terms of API for accessing and utilizing the new service. For example, the service provider may indicate that it prefers those service nodes that support RESTful API.

Security: indicate the security requirement for the potential service node. This could be from various aspects, such as authentication and authorization.

Data Storage: indicate the requirement from data storage perspective for the service node to add the new service. This could define the size of data storage, data base technology used, and related parameters, such as how many queries could be done per second in the data base.

Aggregation preference: indicate if the service node with aggregation capability is preferred or not when adding multiple new services.

According to the application it is envisaged that the service node selection criteria may include only a part of above mentioned aspects for different services, which have different features and functionalities. Table 3 as shown below is an example of the service node selection criteria for a new data analytics service, which requires high computational capability and full access right by service provider. Note that those mandatory criteria have to be satisfied, while the optional tags are preferred when selecting the service node.

TABLE 3

| Criteria Condition | Description | Mandatory/Optional |
|---|---|---|
| Service node location | Service node is preferred staying within 2 hops away from service provider | M |
| Service Domain Requirement | Service node should stay in the same service domain as that service provider registers with | M |
| Access control | Only service node that grants full (CRUD) right to service provider could be selected to add the new service | M |
| Underlying network protocol | Service node is expected to support CoAP/HTTP | M |
| API support | RESTful API is preferred | O |
| Load balance | Service node is expected to have at least 10TB capacity for data storage | M |
| | With low other computation load and communication traffic | O |
| Security | End-to-end authentication is supported by the service node adding the new service | M |
| Data storage | Relational data base is supported | M |
| | Non-Relational data base is supported | O |
| | Storage size is at least 10TB. | M |

Procedure of Collaboration

Figure 10:
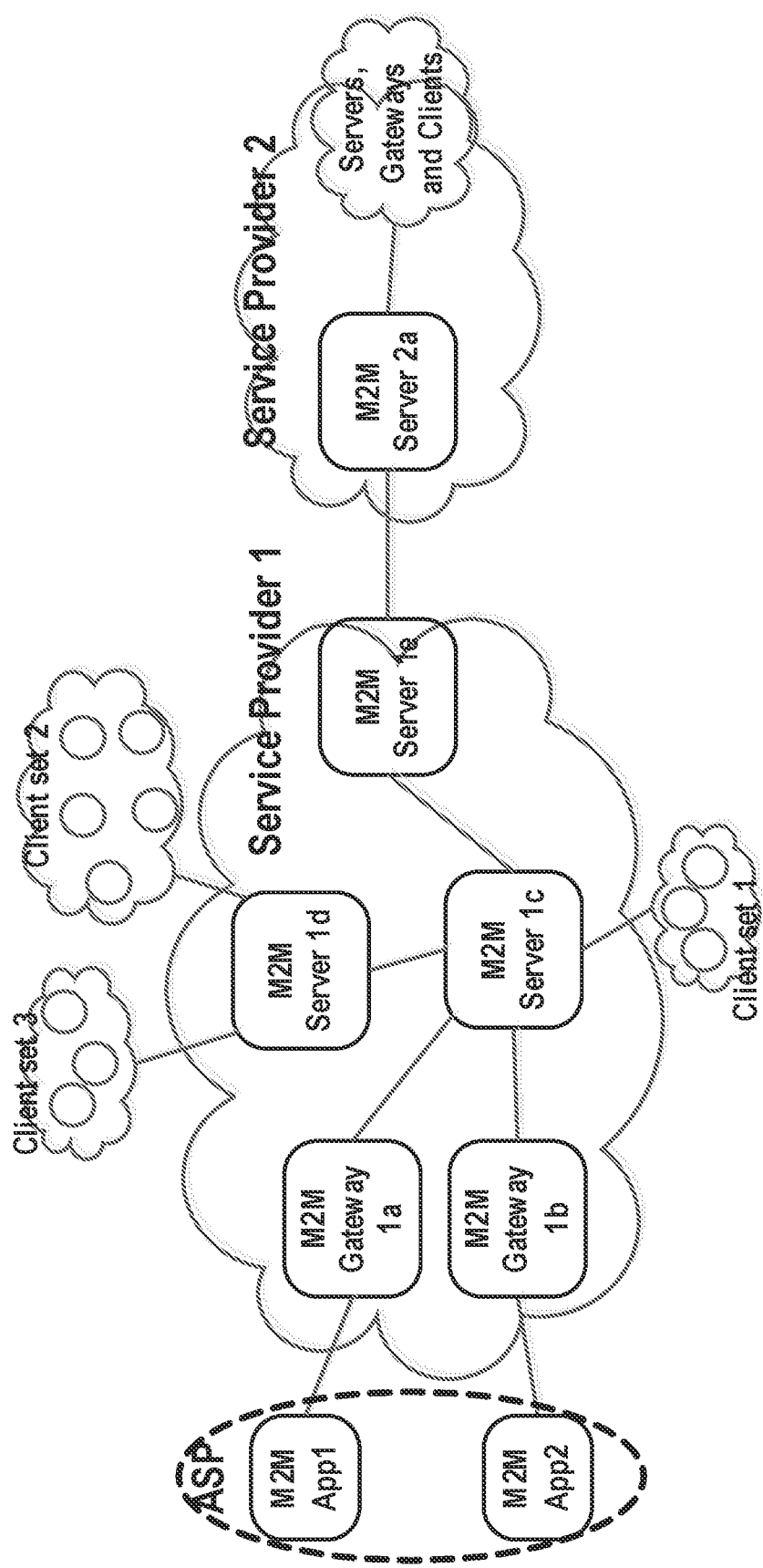
FIG. 10 illustrates a service layer network according to an embodiment of the application.

According to even another embodiment, FIG. 10 presents an example of a service layer network consisting of ASPs, e.g., M2M applications 1 and 2, SLEs in networks of two service providers, e.g., M2M gateways and M2M servers, and service layer clients. According to this embodiment, the M2M server 1e and M2M server 2a are responsible for carrying the inter-domain traffic between the two service domains. Moreover, this embodiment presents the operations of collaboration among ASP and SLEs in service providers' networks before adding the new service. The collaboration may include one or more of the following:

Policy collaboration: exchange the service enablement policy, and solve the conflict if the policy specified by application service provider is different from the ones maintained by service layer entities, e.g., set by service provider.

Service node selection criteria collaboration: exchange the selection criteria for selecting service node for adding the new service, and solve the conflict if the criteria specified by application service provider conflicts with ones maintained by service layer entities.

Retrieve information of other service layer entities: the information obtained will be used in the service node selection process, which consequently could result in better choice.

Figure 11:
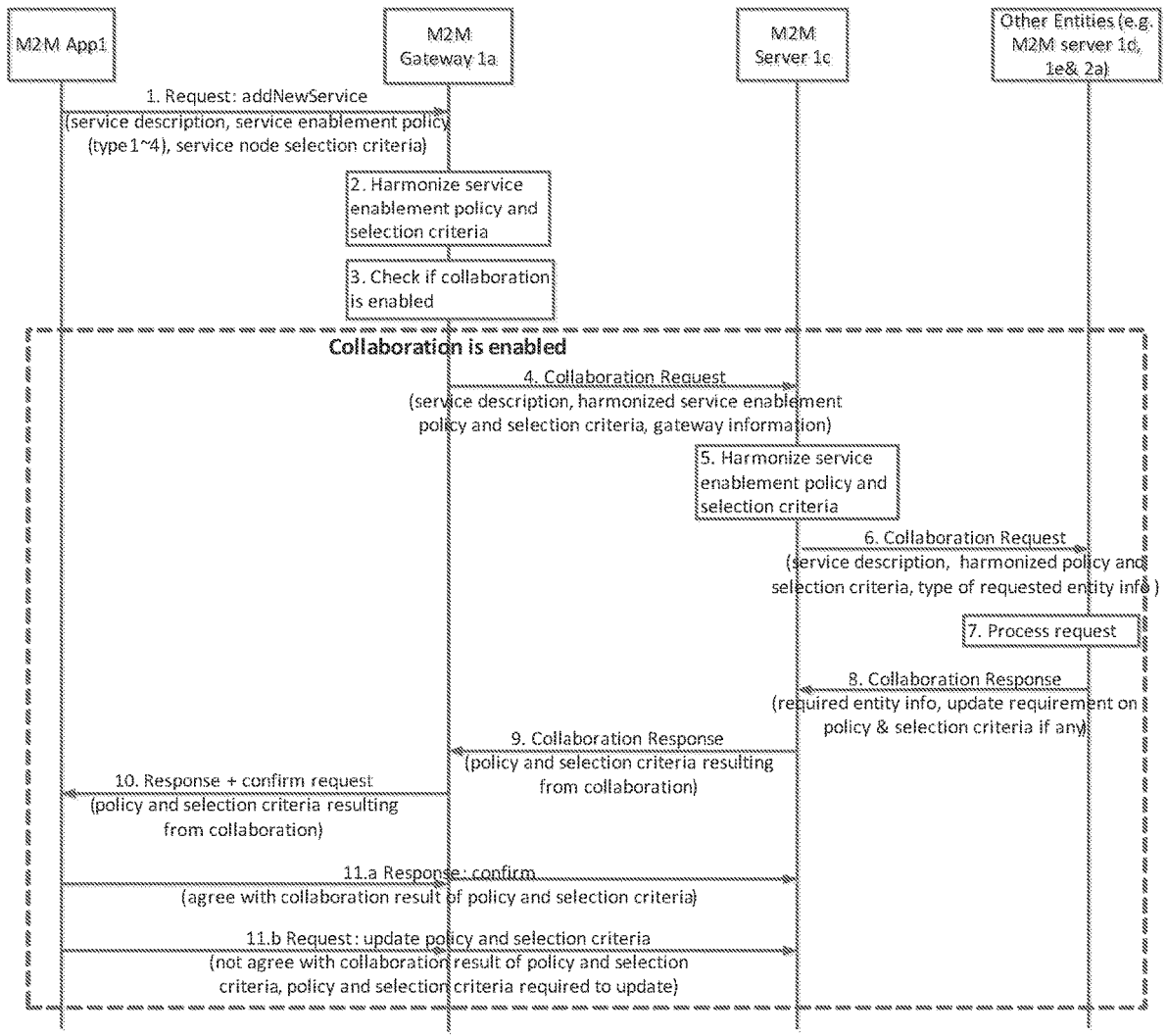
FIG. 11 illustrates a procedure for collaboration according to an embodiment of the application.

According to another embodiment, FIG. 11 shows an exemplary procedure of collaboration based on the network in FIG. 10. It may be assumed, according to an exemplary embodiment, M2M application 1 would like to define a new service, and M2M server 1c is going to perform the service node selection process. The collaboration procedure includes the following steps denoted by Roman numerals in FIG. 11. According to Step 1, the ASP, e.g., M2M application 1, initiates a request to M2M gateway 1a for adding a new service. The request message may contain following information: a service description, service enablement policy, and service node selection criteria.

Specifically, the service description may provide some information describing the new service. This may include, for example, a key functionality of the new service, application service provider ID, service ID, software module information, protocol support, and the charging method. Separately, the service enablement policy may provide policies guiding all of the processes for adding a new service reflecting the ASP's intention. Even further, the service node selection criteria provide a set of criteria for the service node selection process.

Next, in accordance with Step 2, upon receiving the request, M2M gateway 1a may initially process the service enablement policy and service node selection criteria specified by the application service provider. In other words, gateway 1a would harmonize the policies and criteria if a perceived or actual conflict exists. For example, the ASP of a new charging service would like to allow cross-domain collaboration and cross-domain service nodes to host the new service. However, M2M gateway 1a knows that cross-domain service nodes are prohibited for any charging related service by the service provider during the policy configuration phase, shown as FIG. 9. Therefore, M2M gateway 1a would disable the cross-domain service node in the policy configuration. In one example, a new data storage service may require a service node to support both the relational and non-relational database, which will be accepted and updated by the M2M gateway 1a.

In general, rules may be followed or used during the process of harmonization as will be discussed below. First, all the policies that are set by the service provider and maintained by service layer entity in service provider's service layer should be enforced even if ASP specifies some policy that conflicts with these. Second, if ASP specifies some policy that is related to a certain area on which the service provider does not have any policy, then service layer entity needs to check the service provider's policy to see if the ASP-policy potentially conflict with service provider's policy. For example, ASP defines a new service requiring concurrent use of location service, while the service provider does not have any policy specifying if concurrent use of its location service with a third party service, e.g., assuming the service provider provides a common location service, is enabled or not. If there is a potential conflict, service layer entity still needs to apply SP's policy and inform ASP later. If no potential conflict, then service layer entity could integrate the ASP's policy into a set of service enablement policy specific for the new service.

Next, in step 3, the M2M gateway 1a checks whether collaboration is allowed. If it is enabled, the M2M gateway and will continue the collaboration procedure. According to step 4, M2M gateway 1a sends a collaboration request to its registered M2M server 1c for exchanging policy and selection criteria. The request message includes the service description, harmonized policy and service node selection criteria. It is worth noting that the policy and selection criteria contained in this request is already updated by M2M gateway 1a as mentioned in step 2, which may be different from the original ones specified by the application service provider. In step 5, M2M server 1c will further harmonize the received policy and selection criteria. The reason is that M2M server 1c may have broader knowledge of network status than M2M gateway 1a, such as access policy for clients in different service domains.

According to step 6, since M2M server 1c is assumed to perform service node selection, it will send collaboration requests to other SLEs, e.g., M2M server 1d, 1e or 2a, to retrieve more information. The request will contain the service description information, harmonized policy and selection criteria, and type of requested entity information, such as security method used by the service layer entity, willingness of adding the new service, or data storage capability.

Next, in step 7, upon receiving the collaboration request, the SLE's will determine if the policy and selection criteria conflict with the ones they maintained, and provide the required information based on the service description. For example, based on the service description, the M2M server 1d may not want to add the new data analytics service due to the high requirement of computation capability and large amount of data storage. In step 8, the response with required information is returned to M2M server 1c. In step 9, M2M server 1c consolidates all of the information, and sends the response to M2M gateway 1a for confirmation of the ASP. In step 10, the M2M gateway 1a sends the collaboration results, e.g., harmonized policy and selection criteria, to the application service provider, which is requested to review this information.

According to Step 11a, in case the ASP is fine with all of the results, it just sends confirmation responses to M2M gateway 1a and M2M server 1c. This will trigger a service node selection process. Moreover in Step 11b, if ASP is not fine with some policies or criteria, it will provide some feedback to further update the policy or criteria to M2M gateway 1a. Step 2 may be repeated for further collaboration.

Figure 12:
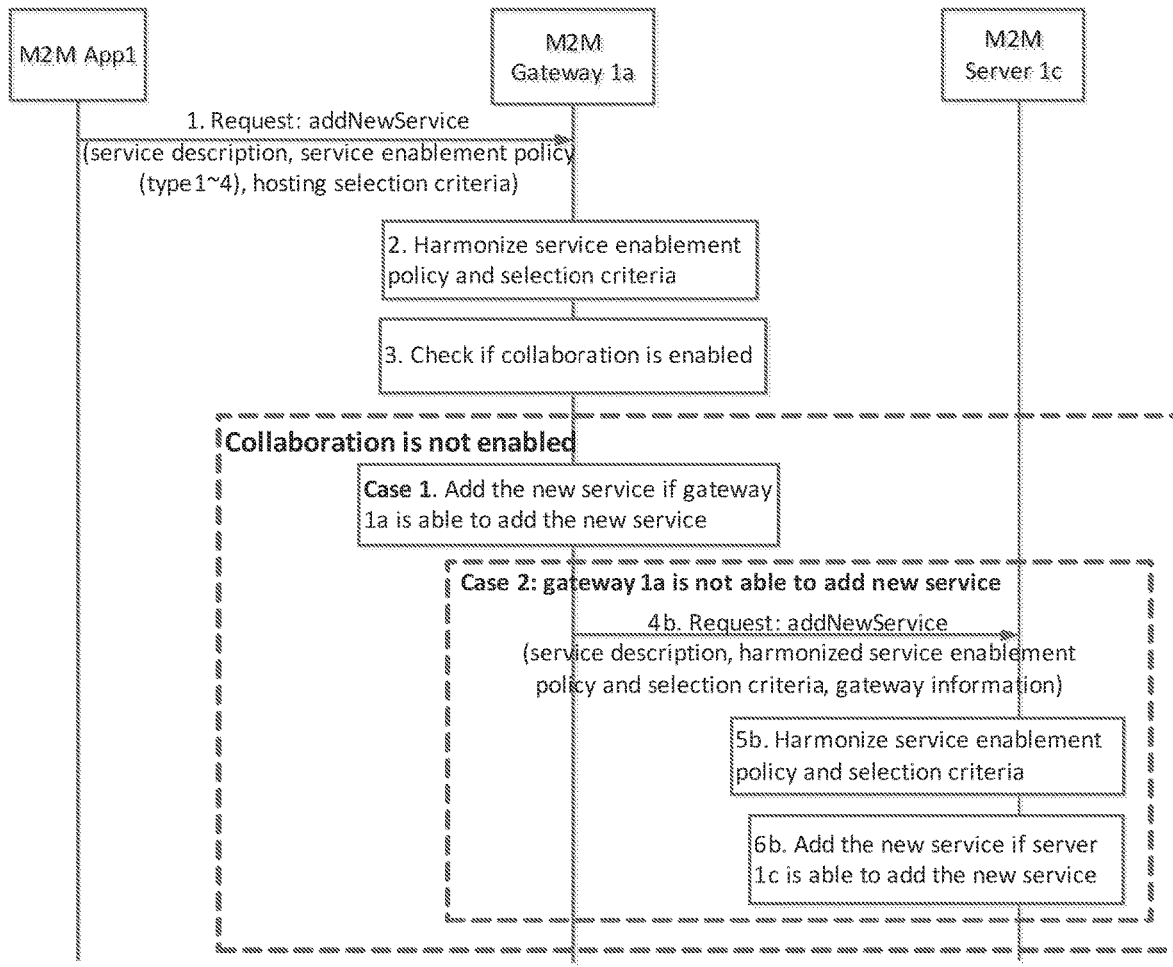
FIG. 12 illustrates a procedure for collaboration when it is not enabled according to an embodiment of the application.

According to yet even another embodiment, FIG. 11 assumes that collaboration is enabled. Each of the steps is represented by a Roman numeral in FIG. 11. It is envisaged according to the contents of this application that collaboration may also be disabled. In this case, M2M gateway 1a is expected to add the new service. However, if M2M gateway 1a is not able to add the new service, it will forward the information about the new service to its registered entity, i.e., M2M server 1c. M2M server 1c will then directly add the new service. FIG. 12 illustrates the procedure in case that collaboration is not enabled, where it is assumed the service node selection is disabled if collaboration is disabled.

Service Node Selection

According to another aspect of the application, a method of selecting one or multiple service node(s) for adding the new service is disclosed. Three possible outcomes of the service node selection process are discussed below. In the first outcome, only 1 service node is selected for the new service. This may be determined by the policy that only 1 service node is allowed, or due to the case that only 1 service node meets all the policies and service node selection criteria. In the second possible outcome multiple service nodes are selected for adding the new service. For example, the M2M server 1c, M2M server 1d and cross-domain M2M server 2a may be selected to add a new service to enable a more convenient and/or efficient way to utilize the new service. In the third possible outcome, none of the service nodes in service provider's network qualify all of the criteria. Accordingly, the entity performing selection process will start the collaboration process for either adjusting criteria or stop adding new service.

Figure 13:
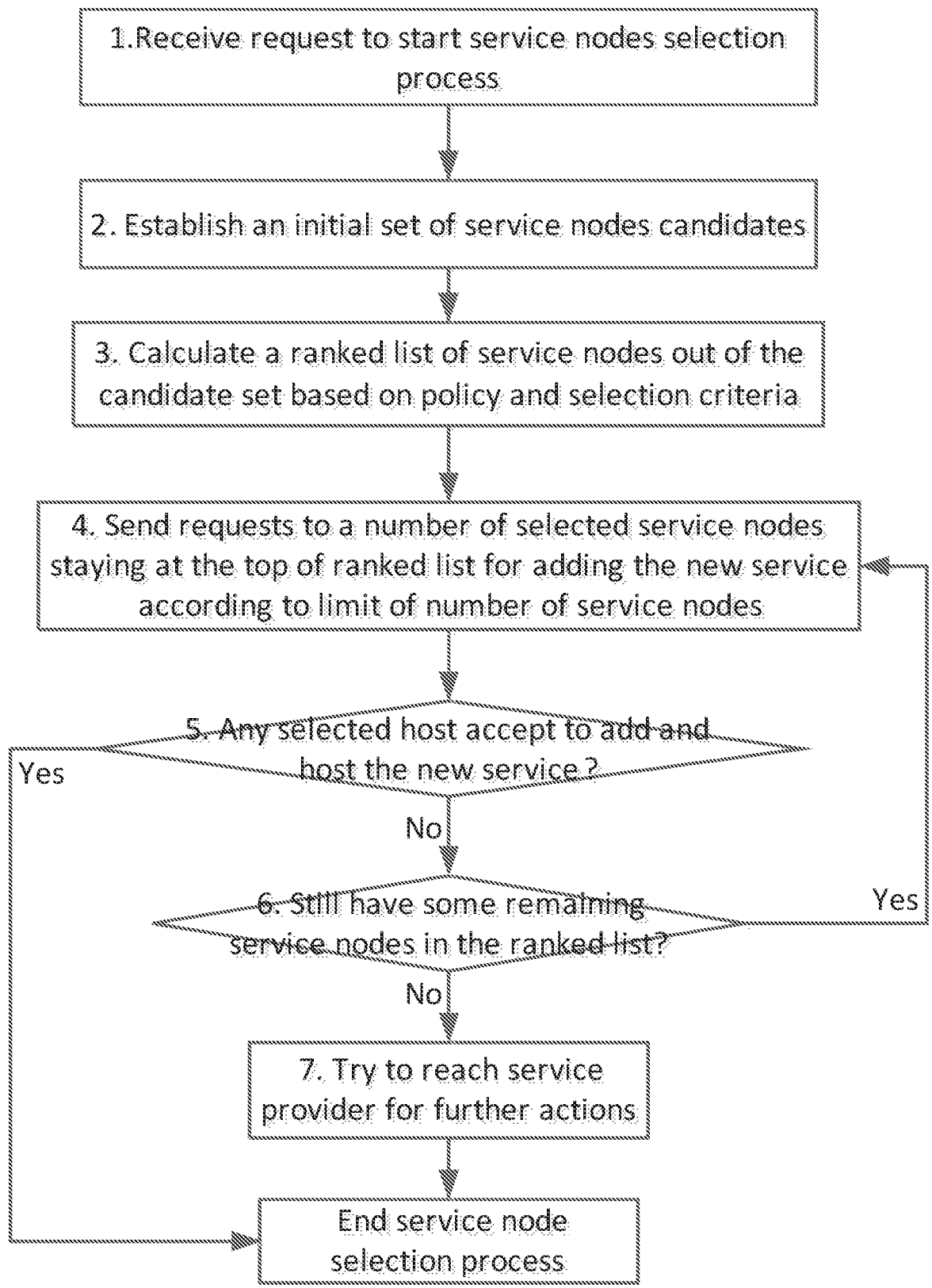
FIG. 13 illustrates a method for selecting a hosting node for a new service according to an embodiment of the application.

Assuming that M2M server 1c performs the service node selection process, FIG. 13 illustrates a service node selection flow for adding a new service. FIG. 13 includes one more steps represented by Roman numerals. According to step 1, M2M server 1c initiates the service node selection process when it determines that collaboration process is done. It is also envisaged that a request message triggers the start of a selection process. The request message may include a service description, harmonized policy and the service node selection criteria. In step 2, an initial candidate set is established containing several service nodes that could be potentially selected to add the new service. The initial candidate set could be established through different ways. For example, an M2M server may include all gateways and servers registered with it, or include all the servers within the same service domain. This could be achieved by resource discovery as one possible way.

In step 3, the M2M server 1c calculates a ranked list of service nodes to add new service based on the candidate list and the harmonized service node selection criteria. One way to do that is by the M2M server removing the candidate that does not align with the mandatory service node selection criteria, and then ranking the remaining candidates based on policy and selection criteria. By so doing, the outcome of this step is a ranked list of service nodes.

According to step 4, with the ranked list of service nodes, M2M server 1c sends one or multiple requests to service node(s) that are ranked at top of the list. The number of requests is determined in accordance with the selection policy. For example, if only one service node is allowed to add the new service, M2M server 1c will send a request to the first ranked service node. However, if four service nodes are allowed, the 4 would be the minimum.

In step 5, a determination based upon a query is made on whether any selected host will add and host the new service. If yes, the selection process ends. Otherwise, the flow diagram continued to step 6 before re-sending the request. In step 6, if no service node accepts the request sent in step 4, M2M server 1c first checks if there is any remaining service node in the ranked list resulting from selection process. If yes, go back to step 4. In other words, M2M server 1c will resend request to the remaining service node in the ranked list. For example, if M2M server 1c sends requests to the first 2 service nodes in the list in step 4, but neither accepts the request. M2M server 1c will send the request to next 2 service nodes staying in $3^{rd}$ and $4^{th}$ in the ranked list. This will be repeated until some service node is willing to add the new service.

In step 7, if there is no remaining service node in the list, e.g., all the ranked service nodes do not accept requests to add the new service, M2M server 1c will try to contact the application service provider to negotiate the next action. In one example, the negotiation is to adjust the selection criteria, or ASP switches to other service providers for adding the new service. Accordingly, this means the selection process ends and the collaboration process may be triggered.

Figure 14:
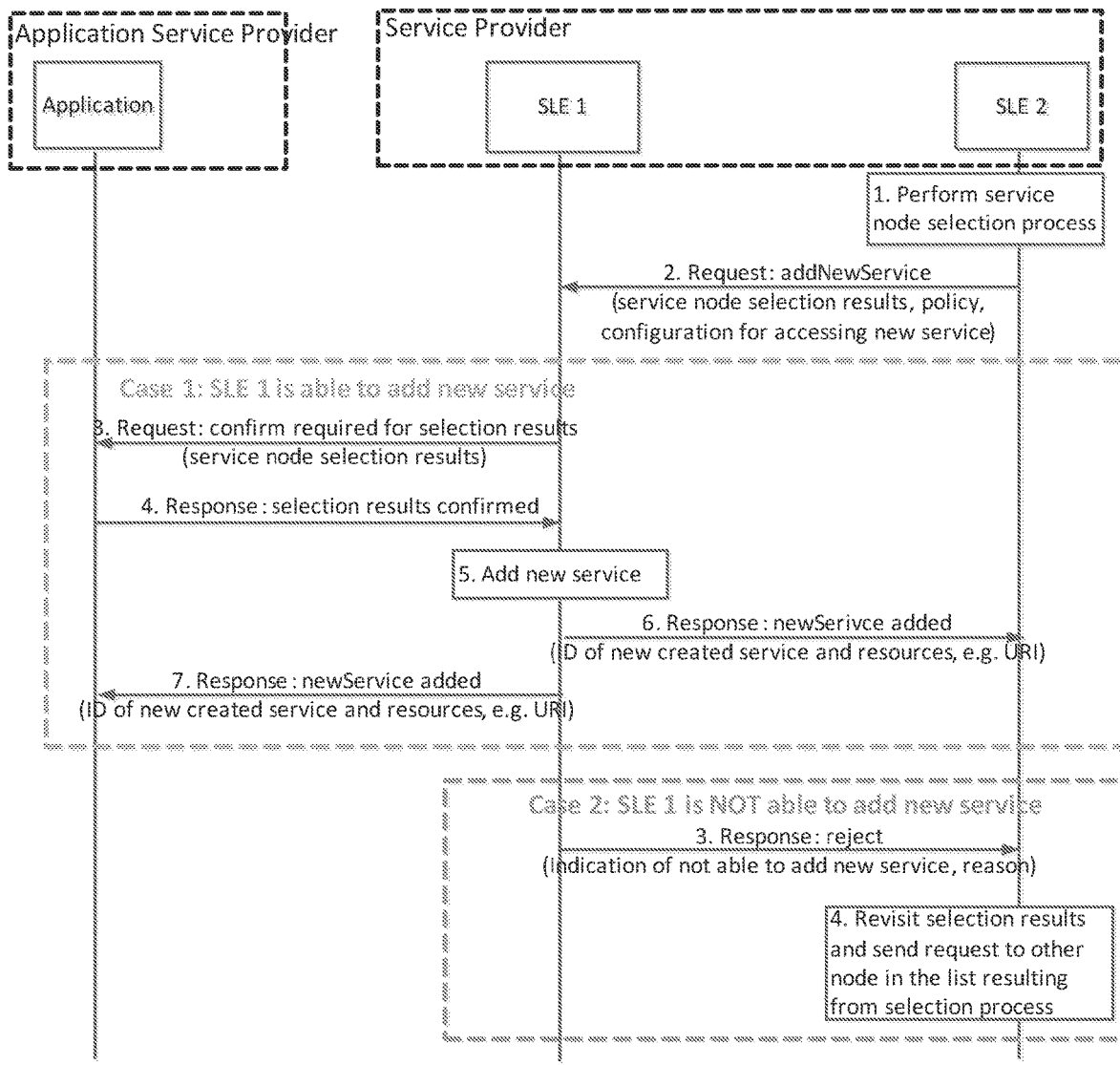
FIG. 14 illustrates a method for post service node selection according to an embodiment of the application.

According to even a further embodiment, the SLE performing the service node selection may have the information of service nodes that could be potentially selected to add the new service. Namely, after the service node selection process, the entity that performs the selection needs to inform the selected service node for adding the new service. For example, according to FIG. 14, a procedure is described for initiating and conducting the service node selection process. In one embodiment, SLE 2 performs the service node selection process and that SLE 1 is selected to add the new service. Each of the steps is denoted by a Roman numeral in FIG. 14. In particular, in step 1, SLE 2 performs the service node selection process. The results may include a ranked list of service node candidates. In step 2, SLE 2 sends the request for adding the new service to SLE 1. The request message may include the following information: (i) service node selection results; (ii) harmonized service enablement policy; and (iii) configuration for accessing and utilizing the new service.

According to Case 1, SLE 1 is able to add the new service. In Case 1, The ASP receives a request from SLE. Namely, the gateway will send the request to the application service provider, which is required to confirm the service node selection results. The request message includes the results of service node selection process. Next, in step 4, the ASP sends back a response to SLE1 or the service provider confirming the selection results. If the ASP does not agree with the results, it may send a response with a required update. This will trigger the collaboration procedures shown in FIG. 12. Next, SLE 1 adds the new service into the service layer platform following the exiting mechanism procedures disclosed above. Subsequently in step 6, after adding the new service, SLE 1 sends a response to SLE 2 with the representation of the new service. The response also includes a method to access/utilize the new service. That is, the uniform resource identifier (URI) of the resource representing the functionality is provided for the newly added resource. In step 7, SLE 1 sends the response to the ASP which includes the representation of the new service, and a method to access/utilize the new service.

According to Case 2, SLE 1 is unable able to add the new service. In this case, SLE 1 will reject the request of adding the new service by sending a rejection response (step 3). This will also include the reason of rejection. The reason, for example, may include a lack of enough computation capability or data storage. Thus, even if the collaboration takes place before the selection process, it is still possible that SLE 1 has some update-to-date information that SLE 2 is not aware of when it was performing the selection process. Upon receiving the rejection response, SLE 2 revisits the selection results, and sends request to other service nodes remained in the list for adding the new service (step 4). According to a further embodiment, the subsequent operations may repeat steps in either Case 1 or Case 2 described above depending upon whether the newly selected service node is able to add the new service or not.

In this application, it is assumed the selected service node always accepts the request to add the new service if it is able to do so. However, it is envisaged that the selected service node may reject the request of adding the new service even if it is able to do so. This may be due to certain reasons. For example, it may be due to the selected service node being unwilling to add the new service due to the latest traffic load. The selected service node will follow operations in Case 2 described above in FIG. 14. The SLE 2 will send request to the next service node in the ranked list resulting from the selection process, which is detailed in FIG. 13. If all the selected service nodes are not able/willing to add the new service, the application service provider will be notified, and further actions will be taken, e.g., adjust the selection criteria or cancel the request of adding the new service. According to the application, if multiple service nodes are selected, SLE 2 performing the service node selection process will send a request to each of them respectively. The requests to each selected service node may be aggregated if the requests are common for all service nodes. In addition, if a service node is selected for adding multiple new services, the selected service node could aggregate the procedures of adding each new service for more efficient processing.

Aggregation Procedures of Adding Multiple New Services

According to another aspect of the application, the service node may attempt to aggregate the multiple procedures of adding each new service in order to improve the efficiency. Generally, this aggregation is performed before the process of adding the new service, and after the collaboration and service node selection processes. Procedure aggregation of adding multiple new services may improve the communication efficiency. For example, in one embodiment, several requests of adding different new services may be destined to the same service node. In other words, a SLE is selected to add multiple new services, so requests to add each new service is aggregated and sent to the selected node. Therefore, the selected entity would be able to perform one procedure of adding all the new services.

According to another embodiment, one common request of adding a new service may be destined to multiple service nodes. In word words, multiple service layer entities are selected to add a new service. Thus, one request is sent to all of these nodes for adding the new service.

In both cases, the SLE performing the service node selection process will examine if it is possible to aggregate requests. In addition, the selected service node will examine if it is possible to aggregate multiple procedures of adding new services.

Figure 15A:
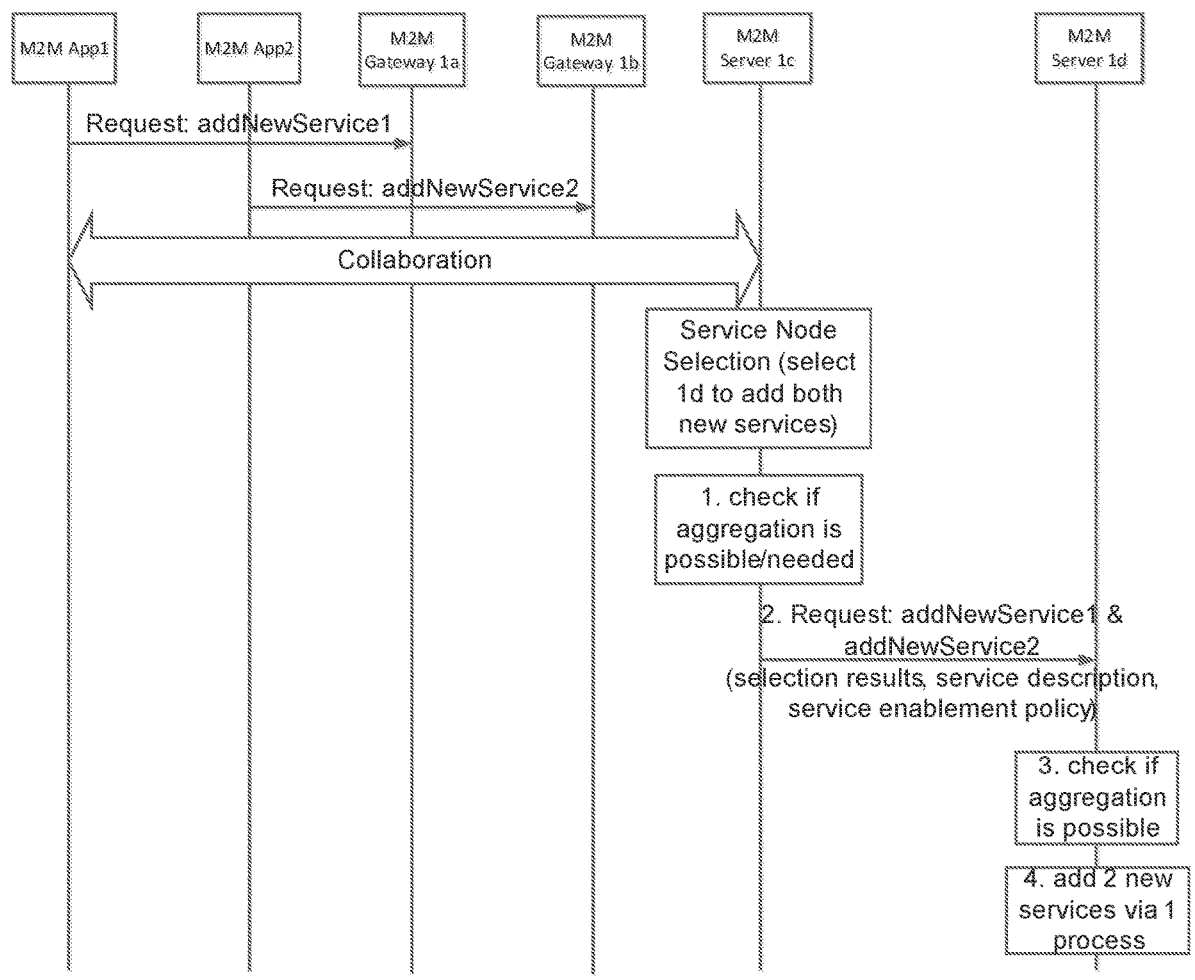
FIG. 15A illustrates a method for aggregating procedures for adding multiple new service according to an embodiment of the application.
Figure 15B:
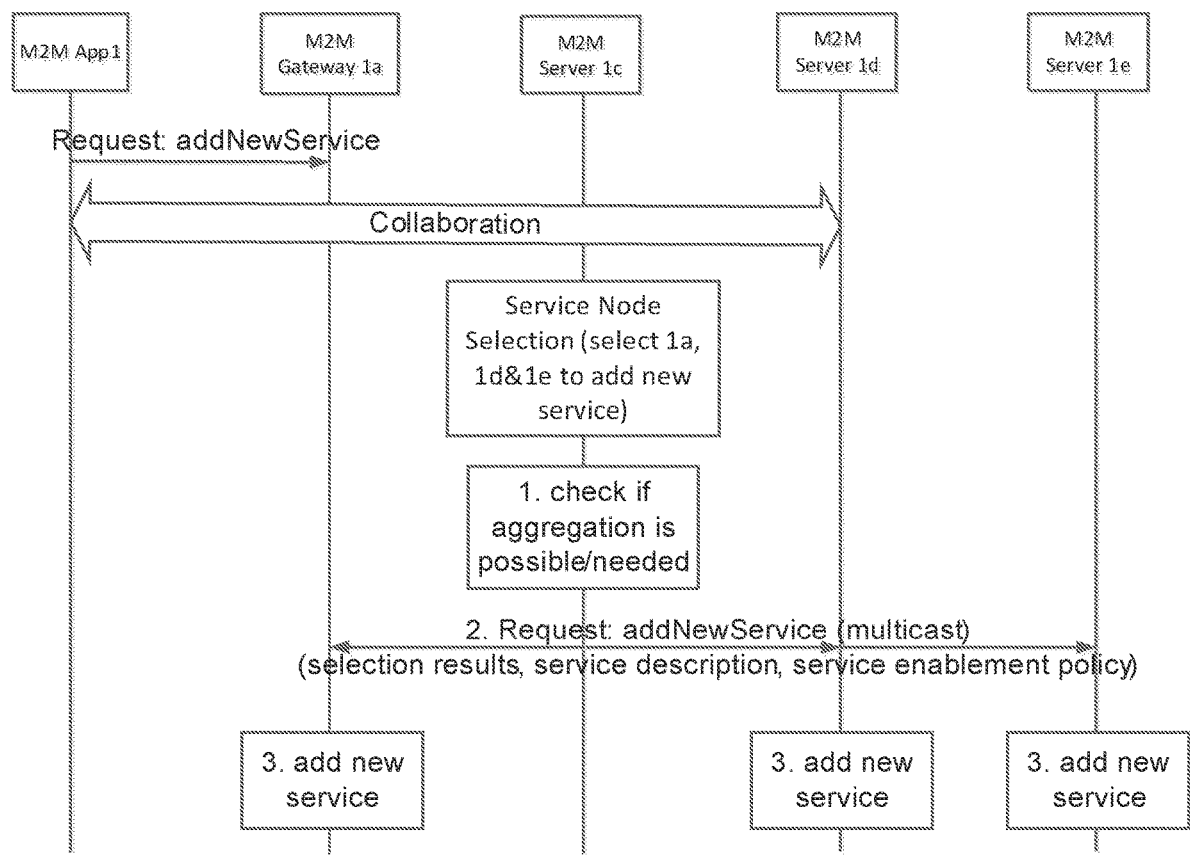
FIG. 15B illustrates a method for aggregating procedures for adding multiple new service according to another embodiment of the application

FIG. 15A illustrates the procedures of aggregation in view of the above-mentioned embodiments. Namely FIG. 15B illustrates the aggregation procedures where two new services are provided by M2M application 1 and 2 respectively, and M2M server 1c performs the service node selection, and selects M2M server 1d to add both new services. Each of the steps is denoted by a Roman numeral in FIG. 15A. In step 1, after collaboration and the service node selection process, M2M server 1c examines if the aggregation is possible. Namely, it will check whether on two aspects. The first is multiple messages to one destination service node. The second is one common message to multiple service nodes. In this case, M2M server 1c determines that the requests of adding both new services are destined to the same M2M server 1d. As such, it decides to aggregate the two requests. In step 2, the aggregated request message is sent to M2M server 1d. The request message may include the service information of both services, policies of both services and the selection results. In step 3, before adding the new services, M2M server 1d checks if it is possible to aggregate the processes of adding two new services. Further, the M2M server 1d adds the two new services through 1 process (step 4).

According to another embodiment as illustrated by FIG. 15B, it is assumed that a new service is provided by M2M application 1, and M2M server 1c performs the service node selection which selects M2M gateway 1a, M2M server 1d and 1e to add the new service. In step 1, after collaboration and the service node selection processes, M2M server 1c examines if the aggregation is possible following the same way as step 1 for case 1. A common request of adding the new service is destined to multiple service nodes. In step 2, the M2M server 1c decides to aggregate the request to different service nodes, which are requested to add the new service. In the request message, the IDs of all the destination service nodes are included. In step 3, each selected service node adds the new service respectively, following the existing mechanisms, e.g., methods described above. While the aggregation process happens after service node selection process, aggregation could be one of the factors that are considered by the service node selection process. In other words, aggregation may be one of the criteria to optimize the performance when selecting service node to add new services.

OneM2M RESTful (RoA) Functional Architecture Embodiment

Figure 16:
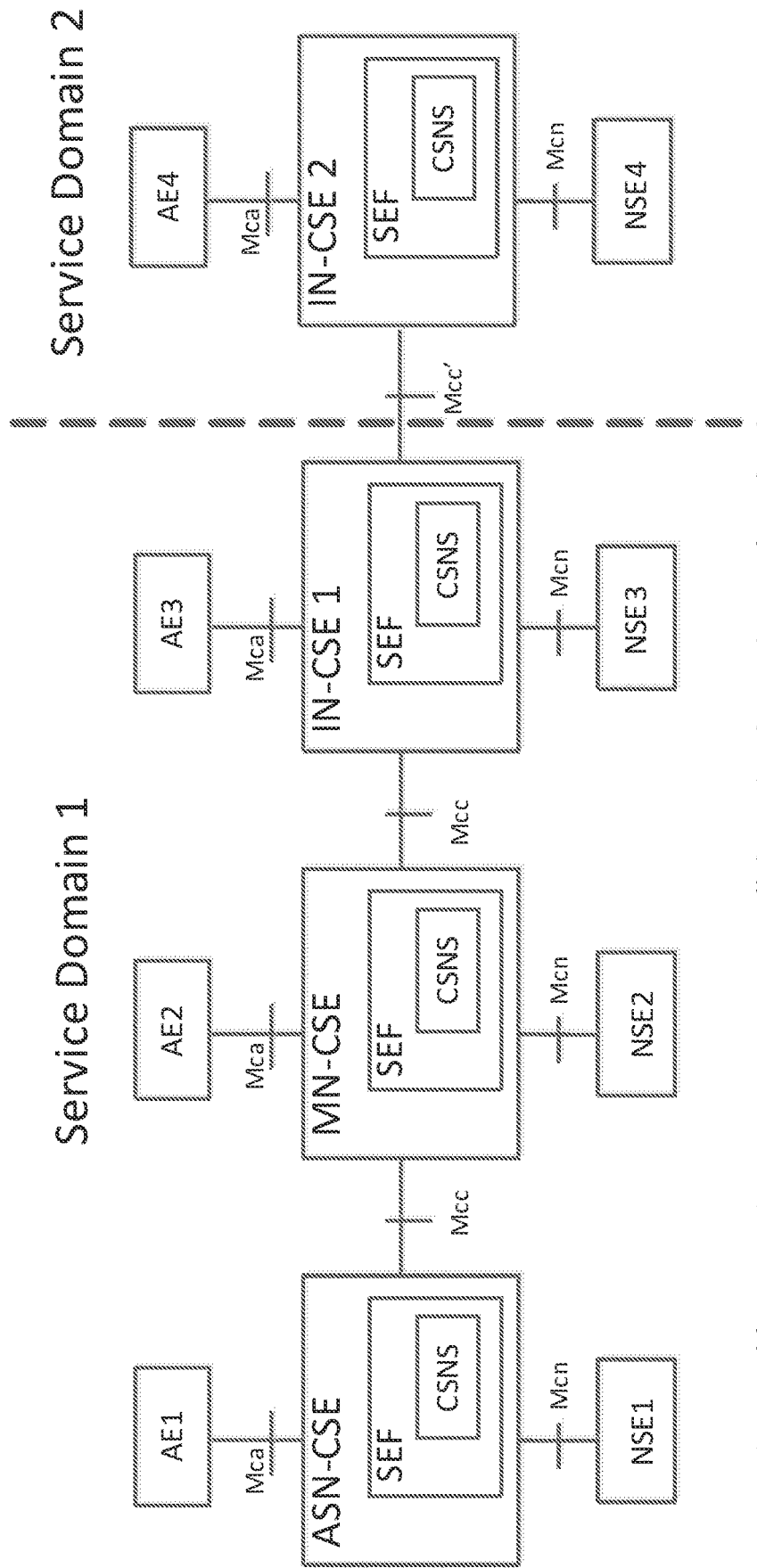
FIG. 16 illustrates collaboration and service node selection functions in oneM2M function architecture according to an embodiment of the application.
Figure 17:
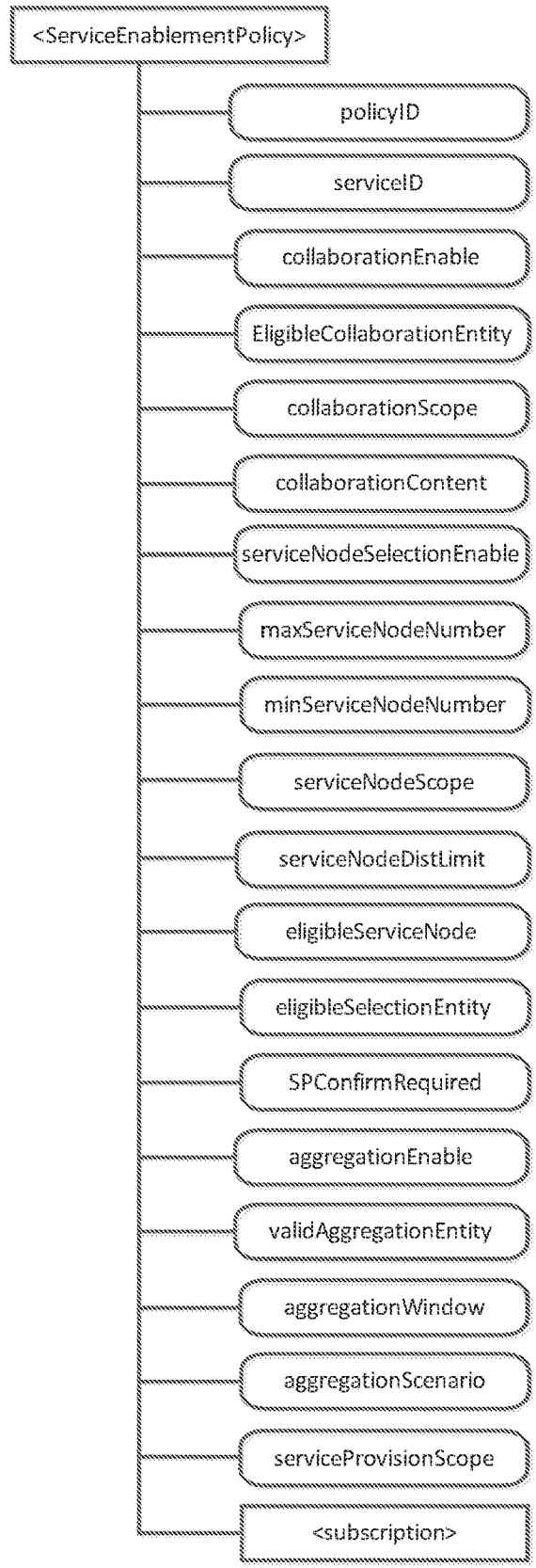
FIG. 17 illustrates service enablement policy resource structures according to an embodiment of the application.

FIG. 16 illustrates an exemplary embodiment for enhancing the existing oneM2M functional architecture to support the collaboration and service node selection functionality, where the Collaboration and Service Node Selection (CSNS) functions are implemented as a part of the Service Enabler Function (SEF). It is also possible that these two functionalities are provided as standalone CSFs inside a CSE. With the collaboration policy and the service node selection criteria, the initiator includes the information needed to add a new service, in the format of RESTful resources. The rectangle with a rounded corner indicates attributes. The "< >" indicates information defined as a sub-resource. A sub-resource can be further defined by attributes. FIG. 17 illustrates the structure of <serviceEnablementPolicy> resource, consisting of different aspects regarding collaboration of adding a new service.

The attributes of <serviceEnablementPolicy> resource are further described in Table 4 below.

TABLE 4

| Attribute/child resource | Description |
| --- | --- |
| policyID | This is the unique ID of the service enablement policy. It is created when the resource is created. |
| serviceID | Identifier of the service(s) which this policy could be applied to. |

TABLE 4-continued

| Attribute/child resource | Description |
|---|---|
| collaborationEnable | Indicates whether the collaboration is enabled or not when adding new service(s) |
| eligibleCollaborationEntity | Indicate the type of service layer entity that could be involved in the collaboration process, e.g. infrastructure server |
| collaborationScope | Indicates in which scope the collaboration could take place, e.g., in a specific service domain or in those service domains under the same domain provider |
| collaborationContent | indicate what type of contents/information could be involved during the collaboration process |
| serviceNodeSelectionEnable | Indicates whether the service node selection is enabled or not when adding new service(s) |
| maxServiceNodeNumber | Specifies the maximum number of service nodes for a new service |
| minServiceNodeNumber | Specifies the minimum number of service nodes for a new service |
| serviceNodeScope | Indicates the possible scope/service domain in which the service node could stay |
| serviceNodeDistLimit | Indicate the maximum distance between the service provider/application service provider and the service node. Note that the distance may be defined in different ways, e.g. number of hops. |
| eligibleServiceNode | Indicate the type of service node that is eligible for adding the new service, e.g., M2M server |
| eligibleSelectionEntity | Indicate the type of service layer entity that is eligible to perform service node selection process. |
| SPConfirmRequired | Indicate if the service provider/application service provider needs to confirm the service node selection results before adding the new service |
| aggregationEnable | Indicates whether the aggregation is enabled or not when adding new service(s) |
| validAggregationEntity | Indicate the type of service layer entity that is allowed to do aggregation |
| aggregationWindow | Indicate a period time, such that requests which are received during that period of time could be aggregated |
| aggregationOperation | Indicate what types of aggregation operations are allowed. In other words, this parameter specifies a set of operations for aggregation process. |
| serviceProvisionScope | Indicate the new service is provided for which scope/service domain |

A new attribute "serviceNodeSelectionCriteria", is described in Table 5 below. This new attribute could be added under various types of resources, such as for example, <AE> and <CSEBase> resources.

TABLE 5

| Criteria Condition | Description |
|---|---|
| Service node location | Indicate the preference about the location of the service node, e.g., service node in a specific domain, or service node that has direct connection with service provider/application service provider |
| Access control | Indicates access control criteria when selecting the service node to add the new service. |
| Device management protocol | Indicate the requirement of device management protocol that host supports, e.g., service node is preferred to support OMA DM protocol |
| Load balance | Indicate the preference in terms of load balance perspective |
| Service node type | Indicate the preferred type of service node, e.g., oneM2M IN-CSE is preferred |
| Underlying network protocol | Indicate the preference for the underlying network protocol, e.g., CoAP or MQTT is supported. |
| API support | Indicate the preference in terms of API for accessing and utilizing the new service, e.g., RESTful API is preferred. |
| Security | Indicate the security requirement for the potential service node. This could be from various aspects, such as authentication and authorization. |
| Data storage | Indicate the requirement from data storage perspective for the potential service node selected to add the new service, such as what type of data base is preferred and the size of data base. |
| Aggregation preference | Indicate if the service node with aggregation capability is preferred or not when adding multiple new services. |

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 6-9, 11-13 and 14-15. The computer executable instructions may be stored in a memory and executed by a processor disclosed above in FIGS. 1C and 1D, and employed in devices including a service node, a gateway and a server. In one embodiment, a computer-implemented UE having a non-transitory memory and processor operably coupled thereto, as described above in FIGS. 1C and 1D, is disclosed. Specifically, the non-transitory memory has instructions stored thereon for adding an oneM2M service. The processor is configured to perform one or more of the following instructions: (i) configuring a service enablement policy; (ii) receiving a request to add the service from a service provider; (iii) checking the service enablement policy for adding the service; and (iv) sending a reply to the service provider.

OneM2M Service Oriented Architecture (SOA) Embodiments

Figure 18:
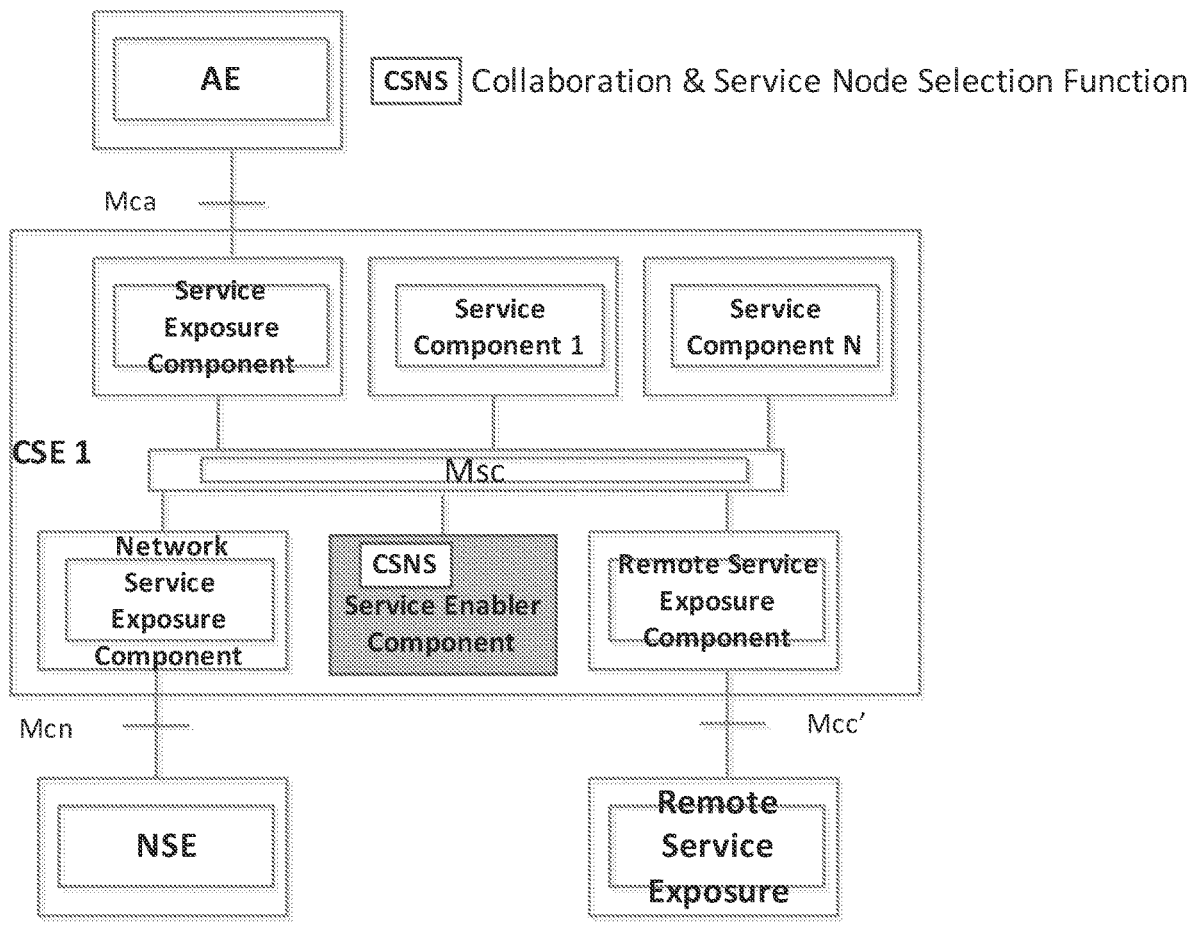
FIG. 18 illustrates collaboration and service node selection functions in oneM2M service architecture according to an embodiment of the application.

This section presents the embodiment to show how to apply the proposed mechanisms and information into oneM2M SoA system. FIG. 18 shows the architecture of applying collaboration and service node selection functions into oneM2M service component architecture (SoA), where Collaboration and Service Node Selection (CSNS) is implemented as a part of service enabler components. Procedures proposed above for RoA could be applied to the SoA architecture.

Device Management (DM) Embodiments Based on oneM2M ROA

This section presents the embodiment to show how to apply the proposed mechanisms and information into underlying device management protocol based on oneM2M functional architecture.

For adding a new service, the underlying device management protocol (e.g., OMA DM or BBF TR-069) could manage to add the new service by installing software to provide the service capability. To facilitate DM protocol for adding the new service, oneM2M service layer is responsible to provide enough information, e.g., service enablement policy and service node selection criteria defined in of the new service. Based on the oneM2M functional architecture, e.g., the resource <mgmtObj> could be used to maintain such information, so that the underlying DM technology could convert the information in the resource to the data model it uses.

Figure 19:
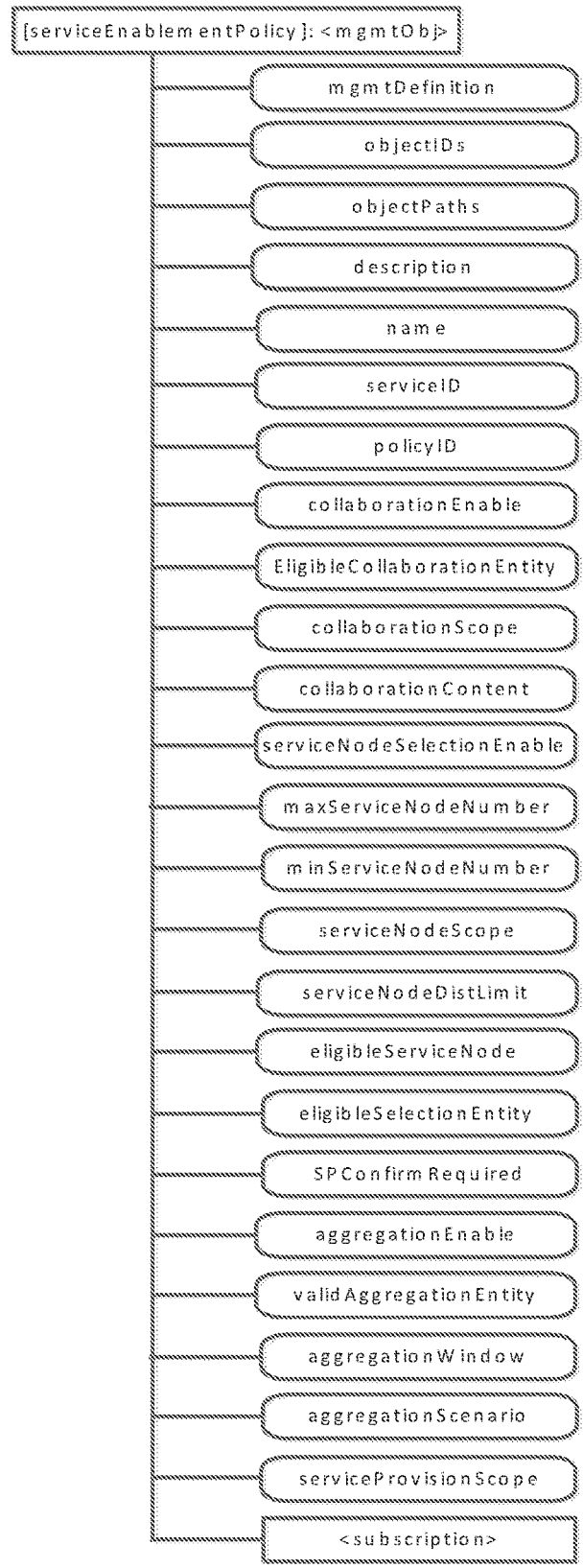
FIG. 19 illustrates a structure of another service enablement policy resource according to an embodiment of the application.

Specifically, [serviceEnablementPolicy] is defined to share the information regarding the policy of adding a new service on the service node as shown in FIG. 19. The resource type of [serviceEnablementPolicy] is <mgmtObj> resource. The attributes of [serviceEnablementPolicy] resource are described above.

Figure 20:
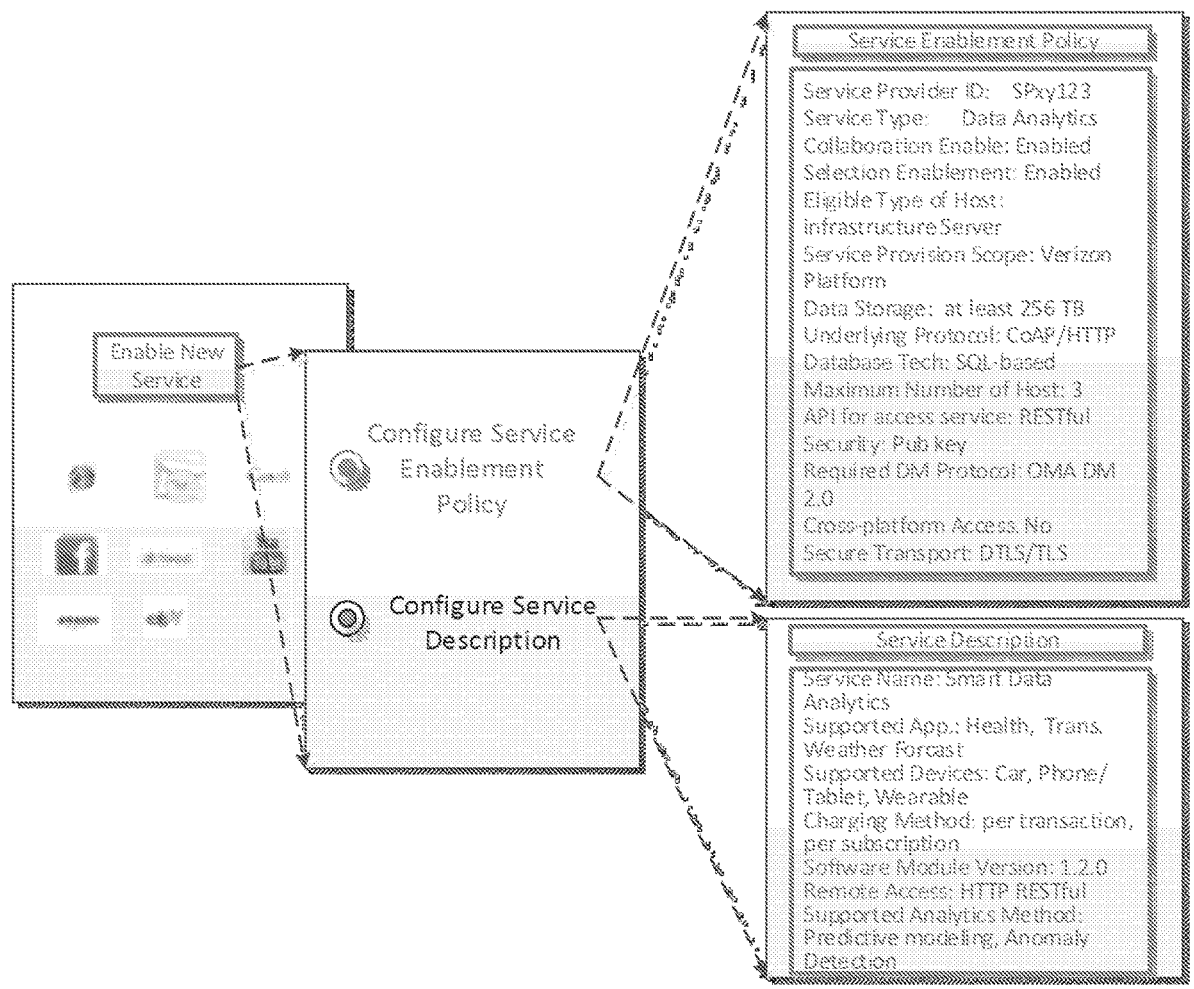
FIG. 20 illustrates a user interface of configuration for enabling a new service according to an embodiment of the application.

The parameters are defined for enabling a new service regarding service enablement policy/selection criteria and service description. A user interface may be implemented for configuring or programming those parameters with default values, as well as control switches for enabling or disabling certain features for defining a new service. An exemplary user interface is shown in FIG. 20. It is envisaged that the graphical user interface of FIG. 20 can be displayed in the display 42 illustrated in FIG. 1C or the display 86 in FIG. 20. By so doing, users can control features via the graphical user interface.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A device on a network, the device comprising:
a non-transitory memory including executable instructions for adding a new service; and a processor operably coupled to the memory, the processor being adapted to:
receive a request to add the new service from a service provider;
check a service enablement policy and host selection criteria specified by the service provider for adding the new service;
determine the service enablement policy and the host selection criteria specified by the service provider conflict with a service enablement policy and host selection criteria of a service layer;
wherein the service enablement policy is selected from a collaboration enablement indication, eligible collaboration entity type, collaboration scope, collaboration content, collaboration trigger conditions, service node scope, eligible service node type, maximum service node number, minimum service node number, maximum distance to service provider, maximum distance to service layer clients, service node selection enablement, eligible type of selection entity, service provider confirm, aggregation enablement, eligible type of aggregation entity, aggregation window, enabled aggregation scenario, service provision scope, list of clients with access right, and combinations thereof;
harmonize the service enablement policy and the host selection criteria specified by the service provider to resolve the conflict; and
send a reply to the service provider confirming harmonization.

2. The device according to claim 1, wherein the host selection criteria is selected from service node location, service domain requirement, access control, underlying network protocol, device management, load balance, service node type, supported API, security, data storage, aggregation preference, and combinations thereof.

3. The device according to claim 1, wherein the processor is further configured to harmonize the service enablement and the host selection criteria policy specified by the service provider.

4. The device according to claim 1, wherein the processor is further configured to collaborate the request received from the service provider.

5. The device according to claim 4, wherein the processor is further configured to determine a service node that meets the service enablement policy and the host selection criteria specified by the service provider.

6. The device according to claim 5, wherein the processor is further configured to send a request to the service node to add the new service.

7. The device according to claim 6, wherein the processor is further configured to receive an acceptance from the service node.

8. The device according to claim 6, wherein the processor is further configured to:
    check if aggregation of plural new services is possible; and send a request to the service node to add the plural new services.

9. The device according to claim 1, selected from a server, a terminal device or a M2M gateway device.

10. A method for adding a new service comprising the steps of:
    configuring a service enablement policy;
    receiving a request to add the new service from a service provider;
    checking the service enablement policy specified by the service provider for adding the new service;
    determining the service enablement policy specified by the service provider conflicts with a service enablement policy of a service layer;
    wherein the service enablement policy is selected from a collaboration enablement indication, eligible collaboration entity type, collaboration scope, collaboration content, collaboration trigger conditions, service node scope, eligible service node type, maximum service node number, minimum service node number, maximum distance to service provider, maximum distance to service layer clients, service node selection enablement, eligible type of selection entity, service provider confirm, aggregation enablement, eligible type of aggregation entity, aggregation window, enabled aggregation scenario, service provision scope, list of clients with access right, and combinations thereof;
    harmonizing the service enablement policy specified by the service provider to resolve the conflict; and
    sending a reply to the service provider confirming harmonization.

11. The method of claim 10, further comprising:
    receiving host selection criteria for facilitating service node selection from the service provider.

12. The method of claim 11, further comprising:
    harmonizing the service enablement policy and the host selection criteria received from the service provider.

13. The method of claim 12, further comprising: determining a service node that meets the service enablement policy and the host selection criteria.

14. The method according to claim 13, further comprising: sending a request to the service node to add the new service.

15. The method according to claim 14, further comprising: checking if aggregation of plural new services is possible; and
    sending a request to the service node to add the plural new services.

16. The method according to claim 11, further comprising collaborating the request received from the service provider.

17. The method according to claim 11, wherein the host selection criteria is selected from service node location, service domain requirement, access control, underlying network protocol, device management, load balance, service node type, supported API, security, data storage, aggregation preference, and combinations thereof.

* * * * *